United States Patent [19]

Slezinger et al.

[11] 3,950,987

[45] Apr. 20, 1976

[54] PIEZO-OPTIC MEASURING TRANSDUCER AND ACCELEROMETER, PRESSURE GAUGE, DYNAMOMETER, AND THERMOMETER BASED THEREON

[76] Inventors: Isaak Isaevich Slezinger, ulitsa Kirova, 40a, kv. 41; Georgy Mironovich Belitsky, Pervomaiskaya ulitsa, 74, kv. 101; Vladimir Alexandrovich Shiryaev, ulitsa Iskra, 7, kv. 34; Jury Vasilievich Mironov, Nagornaya ulitsa, 68, korpus 14, kv. 34; Natalia Lvovna Kaplinskaya, ulitsa Dovatora, 1/28, kv. 70, all of Moscow, U.S.S.R.

[22] Filed: May 13, 1975

[21] Appl. No.: 577,005

[52] U.S. Cl. .......................... 73/141 A; 73/362 R; 73/398 R; 73/517 R; 356/33
[51] Int. Cl.² .................... G01L 1/24; G01L 9/00; G01K 5/18
[58] Field of Search........... 356/33; 73/88 A, 517 R, 73/382, 398 R, 141 A

[56] References Cited
UNITED STATES PATENTS 3,039,298   6/1962   Zandman ........................ 73/88 A
3,800,594   4/1974   Hutchings et al. ............. 73/517 R X

*Primary Examiner*—James J. Gill
*Attorney, Agent, or Firm*—Haseltine, Lake & Waters

[57] ABSTRACT

A piezo-optic measuring transducer is disclosed herein and an accelerometer, a pressure gauge, a dynamometer, and a thermometer based thereon.

The piezo-optic measuring transducer comprises two polarization-optical channels. Each of these channels includes the following components arranged in series downstream the luminous flux produced by a light source: a polarizer, an elastic element which is common to both channels and sensitive to stress variations therein caused by a variation in the measurand, an analyzer, and a photocell. Both channels are provided with a means for varying the intensity of the luminous flux incident upon one of the photocells which intensity variation is opposite in polarity to that in the luminous flux incident upon the other photocell. Both photocells are arranged in a differential relationship with the difference in the electrical signals produced thereby being representative of the measurand. An accelerometer, a pressure gauge, a dynamometer, and a thermometer can be provided on the basis of said transducer.

18. Claims, 31 Drawing Figures

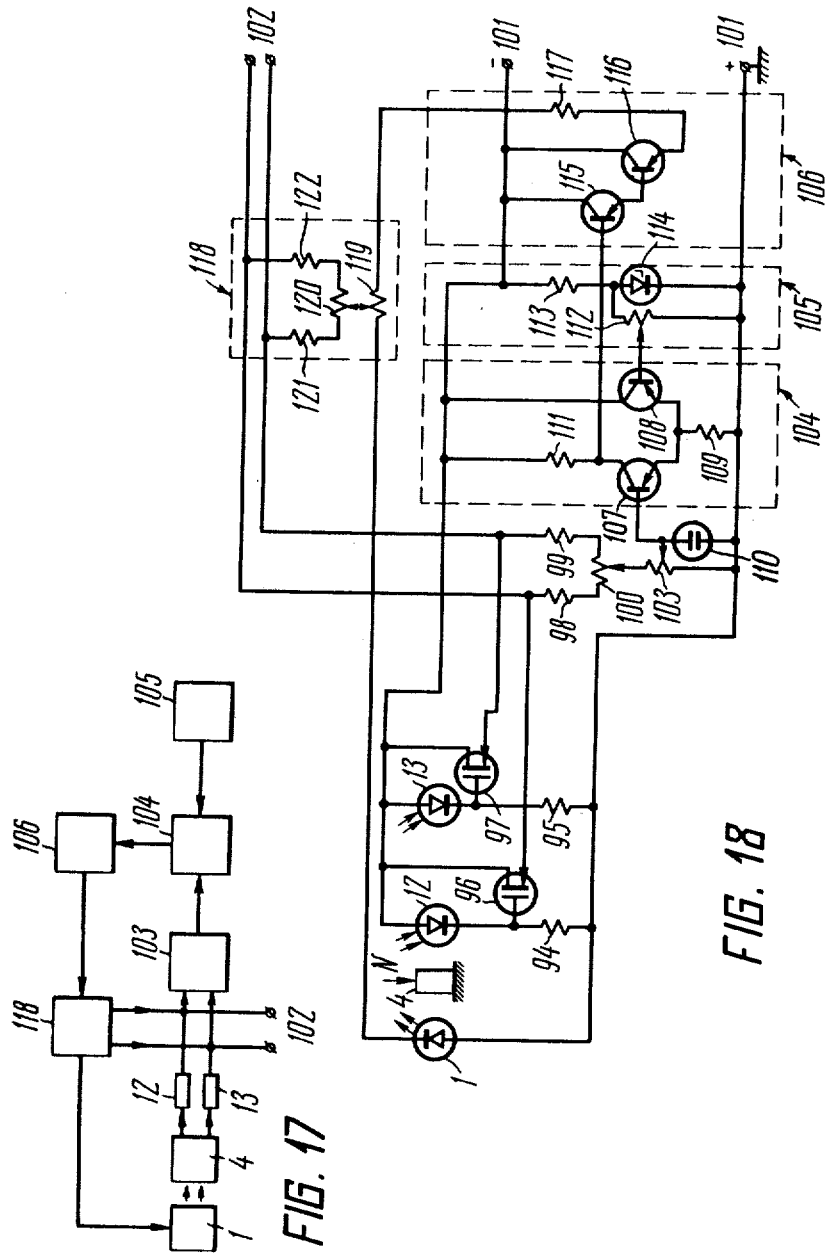

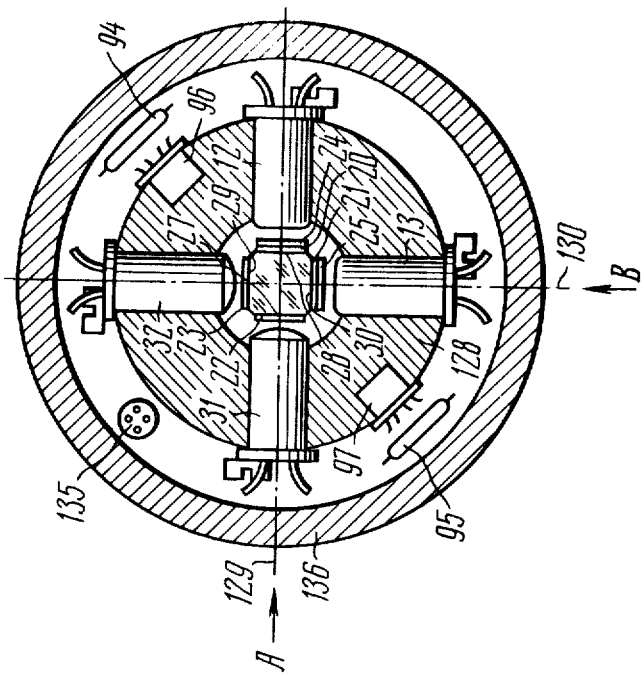
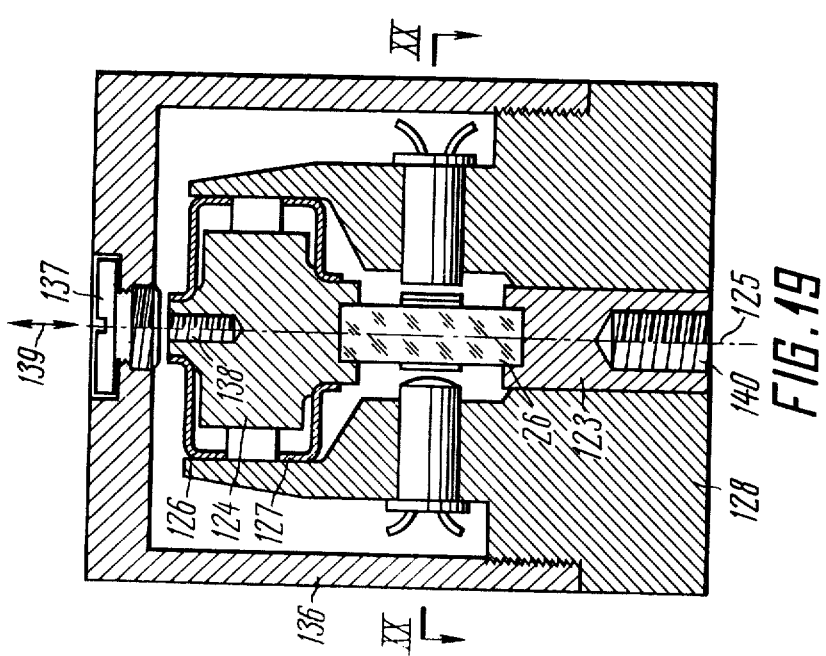

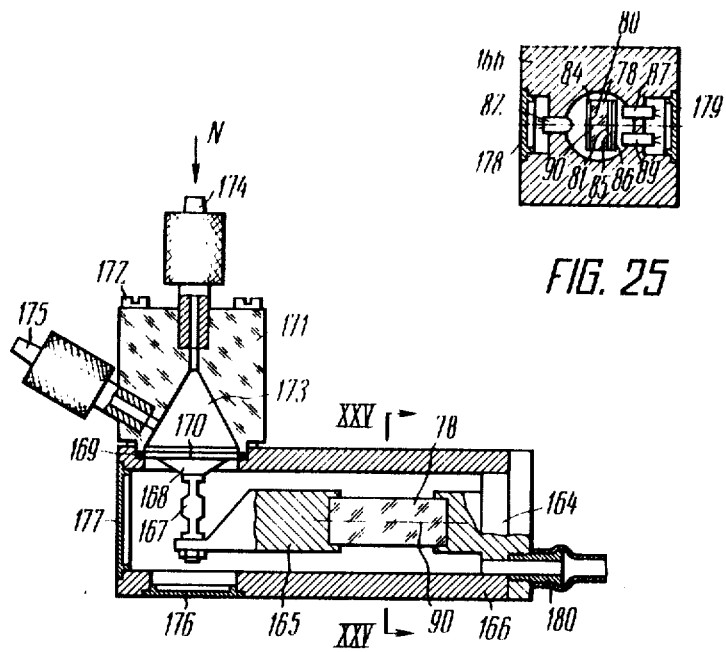
FIG. 25
FIG. 24
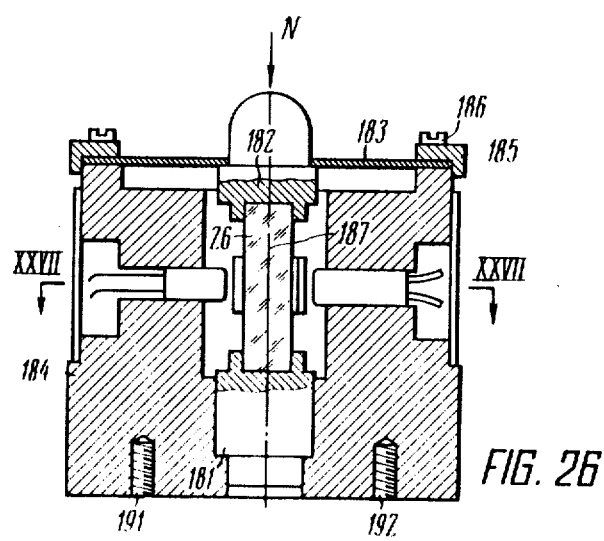
FIG. 26

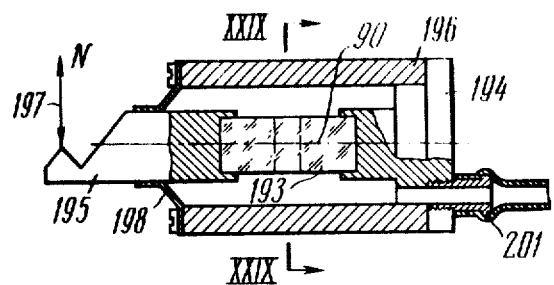
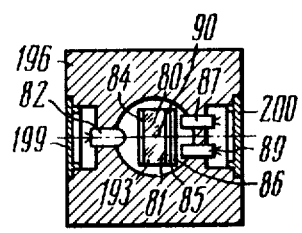
FIG. 28    FIG. 29
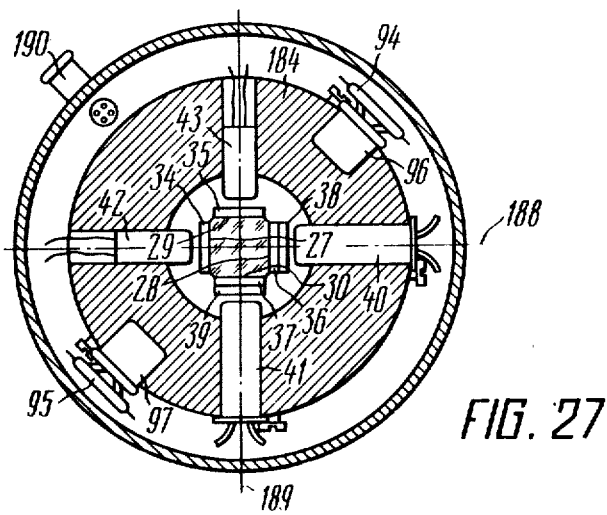
FIG. 27

PIEZO-OPTIC MEASURING TRANSDUCER AND ACCELEROMETER, PRESSURE GAUGE, DYNAMOMETER, AND THERMOMETER BASED THEREON

The present invention relates to primary measuring transducers wherein a mechanical stress variation in an elastic element caused by a variation in the measurand, such as pressure, acceleration, force or temperature, is converted into an electrical parameter, and more particularly the invention relates to piezo-optic measuring transducers and to accelerometers, pressure gauges, dynamometers, and thermometers based thereon.

Known in the art are measuring transducers in which a stress variation in the elastic element thereof causes a variation in a respective electrical parameter. These are, for example, tensoresistive (strain) transducers wherein a mechanical stress variation in the elastic element thereof brings about a variation in the electrical resistance of the tensoresistors (strain gauges) rigidly coupled therewith.

By virtue of their simplicity and tiny size, these transducers have found wide application in technology and scientific research. However, tensoresistive transducers fail to provide for sufficiently high outputs in response to insignificant deformations of their elastic elements, which results in limited frequency response characteristics in dynamic measurements, as well as in more complicated amplifying and recording means in static measurements. This is due to the fact that the change in the resistance of the strain gauge, caused by a variation in the mesurand, is relatively small, hence the low level of the output signal which, regardless of the configuration of the tensoresistive (strain) transducer is in the same ratio to the supply voltage as the strain gauge resistance variation to its initial resistance.

Magnetoelastic measuring transducers are much more sensitive and produce a stronger output signal. A typical transducer of this kind comprises an elastic element made from a ferromagnetic material, which forms part of the magnetic circuit of the electrical system, the magnetic circuit including one or more coils. As the elastic element is under stress, the current through the coils of the magnetic circuit changes proportionally to the change in the measurand.

Since the magnetic and mechanical properties of the known ferromagnetic materials suitable for making elastic elements are not adequate enough, the field of applicatikon of such transducers is limited. They are mostly used as industrial transducers for measuring large-scale values.

Low-scale forces, pressures, accelerations, etc. are normally measured by means of piezotransistor measuring transducers exhibiting high sensitivity and miniature size.

The elastic (sensitive) element of such transducers is made from a ceramic or single-crystal material possessing piezoelectric properties, hence, when it is subjected to mechanical stress, an electric charge appears across its faces. Being advantageous in many respects, these transducers are used extensively. However, due to the fact that their amplitude-frequency response lacks uniformity in the low-frequency band, these transducers cannot be used for studying processes the spectra whereof have low-frequency components. For the same reason, they should be calibrated by dynamic methods, with involves a number of engineering problems. Piezoelectric transducers have a low-power output. This is one of the reasons for the poor noise-proof characteristics of the measuring system, which affects the accuracy of measurement.

Noted for improved noise-proof characteristics are transducers in which the measurand is converted into an output frequency variation. Such transducers include a vibrating member (i.e. a string) the natural frequency whereof is a function of stress.

Transducers of this type have not yet found wide application, mainly because of the relatively complicated construction of the transducer and the electrical devices operating in conjunction therewith.

Also known in the art are optical measuring transducers in which a variation in the transparency of the sensitive element, caused by mechanical stress, is converted into an electrical signal by means of photocells.

A serious disadvantage inherent in this transducer is its extremely low sensitivity, which makes it practicable only for measuring high pressures. The absorption coefficient of germanium from which the sensitive element in this transducer is made (hence, the intensity of the luminous flux) varies approximately by 10% within the range of pressures from 1,000 to 2,000 atm, i.e. the luminous flux intensity variation is equal to only 0.02% per atm.

Piezo-optic measuring transducers are free of most of the above-mentioned disadvantages. In its operation, such a transducer makes use of the piezo-optic effect which consists in that the vicinity of light in a solid transparent body is a function of the mechanical stress therein as well as of the orientation of the light vector with respect to the main stresses characterizing this stressed state.

The basic advantages of a piezo-optic measuring transducer are as follows:

1. High sensitivity. The dimensionless sensitivity (tensosensitivity) S, defined as in the case of strain gauges, i.e. as the relative output voltage variation divided by the relative deformation of the elastic element, may be, in this case, as high as tens and even hundreds of thousands depending on the size and material of the elastic element. This is by several orders higher than in the case of strain gauges, both metal ($S \approx 2$) and semiconductor ($S \approx 200$).

2. High output signal level which may be as high as half the supply voltage. It will be shown below that in actual piezo-optic devices the output may be in the order of several volts.

3. Broad frequency band. The non-uniformity of the amplitude-frequency response is determined, mainly, by the properties of the mechanical vibrating system of a piezo-optic measuring device made up of an elastic element and a mass coupled therewith. The amplitude-frequency response is uniform over the entire low-frequency band down to zero hertz.

Owing to the high mechanical rigidity of the transducer, its natural frequency may be very high so that the working frequency range in the high-frequency band may extend to tens of kHz.

4. Wide dynamic range. Piezo-optic measuring transducers have a relatively low level of intrinsic noise, which is determined, mainly, by the intrinsic noise of the photocells, and does not exceed fractions of a millivolt. Thus, with the output signal level being as specified above, the dynamic range may be in the order of several thousand.

5. Overload stability. The mechanical stress in the elastic element, corresponding to the measurement range of the piezo-optical transducer, may be as low as several kilograms per square centimeter, which is by two orders lower than the ultimate strength of the elastic element material.

6. The requirements on the elastic element material as to its mechanical properties are not stringent. With the above-mentioned low mechanical stress values in the elastic element, its material obeys well Hooke's law.

7. A primary piezo-optic measuring transducer may be made in such a manner that the light source and photocells are spaced a certain distance apart from the transducer itself and connected thereto via a flexible fibre light guide. A transducer so arranged is electrically neutral and, should the optical components be made from materials whose properties remain unchanged under the action of electric and magnetic fields, may be insensitive to interference due thereto.

8. Relatively simple, compact and vibration-proof structure. The elastic element of a piezo-optic measuring transducer can be made from ordinary silicate glass and have the simplest shape possible. The polarizers and analyzers are made as filmtype components which renders them simple and inexpensive, and can be bonded directly to the faces of the elastic element. Used as the light sources and photocells can be miniature and relatively cheap semiconductor components bonded directly to the components of the polarization-optical channel.

9. Simplicity of the electronic devices. Since the piezooptic measuring transducer output signal is highly sensitive, in some cases it can be applied directly to a recording or any other peripheral device.

Known at present are a number of piezo-optic measuring transducers.

In one of such transducers, part of the luminous flux produced by the light source passes through the following components arranged in series downstream of the light source: a polarizer, an elastic element sensitive to a stream variation therein caused by a variation in the measurand, and an analyzer to a photocell, all these components making up a polarization-optical channel, while the remaining portion of the luminous flux bypasses the above optical components and reaches an additional photocell arranged in a differential relationship with the main one. These photocells convert the light incident thereupon into electrical signals, the difference in the signals being proportional to the measurand.

The same principle is used in a prior art pressure transducer fitted into the tip of a flexible probe which is introduced into blood vessels to measure blood pressure.

The prior art piezo-optic transducers have a common disadvantage of being provided with only one working polarization-optical channel. The signal at the output of the additional photocell is independent of the measurand. This results in a lower sensitivity. Besides, in such transducers, the time and temperature stability of the output signal is poor.

It is an object of the present invention to provide a relatively simple piezo-optic measuring transducer.

Another object is to provide a piezo-optic measuring transducer having a high overload stability.

Still another object of the invention is to provide a piezo-optic measuring transducer with an output stable in time as well as unaffected by temperature and other environmental factors.

Yet another object of the invention is to provide a piezooptic measuring transducer sufficiently versatile to be used in various measuring instruments based on conversion of mechanical parameters (accelerations, pressures, forces, temperatures) into an electrical signal, such as accelerometers, pressure gauges, dynamometers, and thermometers.

These objects are attained by that in a piezo-optic measuring transducer wherein part of the luminous flux produced by at least one light source passes through a polarizer, an elastic element sensitive to a stress variation therein caused by a variation in the measurand, and an analyzer to a photocell, all these components being arranged in series downstream of the light source and making up a polarization-optical channel, while the remaining portion of the luminous flux is applied to an additional photocell arranged in a differential relationship with the main one, both photocells converting the light incident thereupon into electrical signals, the difference in these signals being representative of the measurand, according to the invention, the following components are arranged in series downstream of the light source along the path of the luminous flux applied to the additional photocell: a polarizer, an elastic element sensitive to a stress variation therein caused by a variation in the measurand, a means for varying the intensity of the luminous flux incident upon the additional photocell, this intensity variation being opposite in polarity to that in the luminous flux incident upon the main photocell, and an analyzer arranged downstream of the elastic element, all these components making up, together with the additional photocell, a second polarization-optical channel.

It is expedient that the means for varying the intensity of the luminous flux through the second polarization-optical channel, which intensity variation is opposite in polarity to that in the luminous flux through the first polarization-optical channel, be made in the form of phase-shifting plates arranged between the polarizer and analyzer in the first and additional polarization-optical channels, respectively, the phase angles of these plates differing, as measured in radians, by an angle $n\pi$ wherein $n$ is an odd integer and $\pi = 3.14 \ldots$, the polarizers and analyzers in both channels being arranged so that their polarization planes are mutually perpendicular or parallel. The phase-shifting plates may be different in thickness.

To facilitate the process of manufacture of the transducer and to minimize the effect of temperature on the output signal, the phase-shifting plates may be arranged so that the axis of maximum light propagation velocity in the phase-shifting plate of the first polarization-optical channel makes an angle of +45° with the polarization plane of its polarizer, while a similar angle in the second polarization-optical channel is −45°.

To simplify the structure of the transducer, it is preferable that the phase-shifting plates in both polarization-optical channels be oriented in the same manner and have the same phase angles.

In this case, the polarizer and analyzer of one of the polarization-optical channels should be arranged so that if their polarization planes are mutually perpendicular, those of the other polarizer and analyzer should be parallel, and if their polarization planes are parallel, those of the other polarizer and analyzer should be normal to each other, the polarizers and analyzers serving, in this case, as the means for varying the intensity of the luminous flux incident upon the additional photocell, which intensity variation is opposite in polarity to that in the luminous flux incident upon the main photocell.

It is also preferable, in order to enhance the mechanical rigidity of the elastic element, to make it in the form of a right-angled polygonal prism with at least two transparent parallel faces almost normal to the optical axes of the first and second polarization-optical channels.

For a better sensitivity, the piezo-optic measuring transducer should advisably have at least one more pair of polarization-optical channels, all of the polarization-optical channels being divided into two groups so that the photocells of the first group of channels are arranged in a differential relationship with those of the other group.

A higher sensitivity can be attained if the elastic element is made in the form of a beam with two transparent parallel faces, the optical axes of both polarization-optical channels being almost normal to these faces and located on either side of the neutral plane of the beam at almost equal distances therefrom, the elastic element serving, in this case, as the means for varying the intensity of the luminous flux incident upon the additional photocell, which intensity variation is opposite in polarity to that in the luminous flux incident upon the main photocell.

To improve the temperature and time stability as well as to simplify the structure of the transducer, the polarizers of both polarization-optical channels should be made as a single piece.

It is desirable, in order to increase the temperature and time stability as well as to simplify the structure of the transducer, that the analyzers of both polarization-optical channels be made as a single piece.

For the same reason, it is preferable that the phase-shifting plates of both polarization-optical channels be made as a single piece, too.

To stabilize the sensitivity of the piezo-optic measuring transducer, it should be provided with an adder with the photocells of both polarization-optical channels being connected to its inputs, a comparator having its first input connected to the output of the adder, a source of reference voltage connected to the second input of the comparator, and a controlled power supply whose input is connected to the comparator output and whose output is electrically associated with the light source.

To minimize the zero shift of the output signal caused by temperature fluctuations, the piezo-optic measuring transducer may additionally be provided with a source of a compensating signal, having its input connected to the output of the controlled power supply, one of its outputs connected to the light source, and the remaining two outputs connected to the inputs of the adder.

According to the present invention, there is also provided an accelerometer in which a stress variation caused in an elastic element by a variation in the measurand, i.e. linear acceleration, through a mass coupled with the elastic element, is measured by means of a piezo-optic measuring transducer, and in which, according to the invention, the function of the latter is performed by the above-described transducer.

According to the invention, there is further provided a pressure gauge in which a stress variation caused in an elastic element by a variation in the measurand, i.e. pressure, through a diaphragm coupled with the elastic element, is measured by means of a piezo-optic measuring transducer, the function of the latter being performed, in accordance with the invention, by the above-described transducer.

According to the invention, there is also provided a dynamometer in which a stress variation in an elastic element caused by a variation in the measurand, i.e. in force, through a journal coupled with the elastic element, is measured by means of a piezo-optic measuring transducer, the function of the latter being performed by the above-described transducer, in accordance with the invention.

And, finally, according to the invention, there is provided a thermometer in which a stress variation caused in an elastic element by a variation in the measurand, i.e. temperature, through its housing coupled with the elastic element, the thermal expansion coefficient of the housing being different from that of the elastic element, is measured by means of a piezo-optic measuring transducer, the function of the latter being performed, in accordance with the invention, by the above-described transducer.

In the proposed piezo-optic measuring transducer, use is made of at least two active polarization-optical channels, whereby the sensitivity of this transducer is at least twice as high as in the prior art transducers of this kind with a single active polarization-optical channel. The elastic element being made in the form of a beam which is subject to bending has made it possible to increase the sensitivity of the transducer by another order of magnitude.

The use of a two- or multichannel optical arrangement, each channel incorporating optical components identical or similar in structure and made from the same materials, contributes to a better time and temperature stability of the piezo-optic transducer parameters, as well as minimizes the effect of other factors equally affecting both channels on its characteristics.

Using the proposed means for stabilizing the sensitivity of the transducer and compensating for the output signal zero drift due to temperature is instrumental in improving the transducer parameters. This permits a more than tenfold decrease in the sensitivity instability and output signal zero drift due to temperature.

Incorporated in various measuring instruments converting the measurand into an electrical signal, the proposed piezo-optic measuring transducer features a number of advantages over the prior art ones. A highly sensitive wide-band accelerometer can be provided on the basis of the proposed piezo-optic measuring transducer, which can most advantageously be used for studying vibration- and impact-related phenomens.

It is feasible to provide a pressure gauge based on the proposed piezo-optic measuring transducer, the high mechanical rigidity of the latter ensuring a wide frequency range in the cases where the mass applied to the elastic element has a high value, e.g. when the pressure gauge is connected to the object of measurement through a thin and rigid tube. This may be the case, for example, in a medical application when arterial or intracardiac pressure is measured by means of a gauge communicating with the space in which the pressure is being measured through a catheter.

The high rigidity and sensitivity of the proposed piezo-optic transducer make it practical to use it as the basic component of mechanically rigid dynamometers characterized by negligibly small displacements of the point whereto the force being measured is applied.

The high sensitivity and broad dynamic range of the proposed piezo-optic measuring transducer make it feasible to provide a highly sensitive thermometer based thereon with a measurement range of several degrees and a threshold of sensitivity of less than one hundredth of a degree. Such a thermometer is advantageous over the prior art ones in that it features a substantially high sensitivity, high power output and simplicity of the electronic devices used therewith.

The invention will now be described in greated detail with reference to preferred embodiments thereof, taken in conjunction with the accompanying drawings, wherein:

FIG. 17 is a block diagram of another embodiment of the electrical part of the transducer of FIG. 1;

FIG. 18 is an electric circuit diagram of the transducer of FIG. 17;

FIG. 19 is a longitudinal section view of an accelerometer based on the transducer of FIG. 5;

FIG. 20 is a view taken along line XX—XX of FIG. 19;

FIG. 24 is a longitudinal section view of a pressure gauge based on the transducer of FIG. 10;

FIG. 25 is a view taken along line XXV—XXV of FIG. 24;

FIG. 26 is a longitudinal section view of a dynamometer based on the transducer of FIG. 8;

FIG. 27 is a view taken along line XXVII—XXVII of FIG. 26;

FIG. 28 is a longitudinal section view of a dynamometer based on the transducer of FIG. 10;

FIG. 29 is a view taken along line XXIX—XXIX of FIG. 28;

Figure 1:
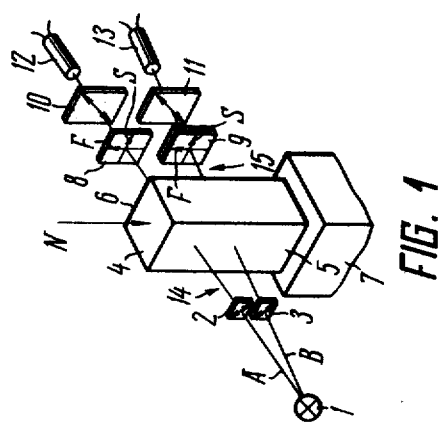
FIG. 1 is an optical diagram of a piezo-optic measuring transducer, according to the invention, with phase-shifting plates of different thickness as well as with polarizers and analyzers the polarization planes whereof are mutually perpendicular.

Referring now to the drawings, the piezo-optic measuring transducer, the optical diagram whereof is represented in FIG. 1, comprises a light source 1 producing a light beam (luminous flux) in the direction of polarizers 2, 3, and elastic element 4 shaped as a right prism with transparent faces 5 and 6, the elastic element 4 being mounted on a fixed base 7, phase-shifting plates 8, 9, analyzers 10, 11, and photocells 12, 13. The elastic element 4 is sensitive to a stress variation therein caused by a variation in the measurand which is converted into a force N. A portion A of the luminous flux passes through one (main) polarization-optical channel 14 in which the polarizer 2, elastic element 4, phase-shifting plate 8, analyzer 10 and photocell 12 are arranged in series downstream of the light source 1, the photocell 12 converting the light incident thereupon into an electrical signal. The other portion B of the luminous flux passes through another (additional) polarization-optical channel 15 in which the polarizer 3, elastic element 4, phase-shifting plate 9, analyzer 11 and photocell 13 are arranged in series downstream of the light source 1, the photocell 13 converting the light incident thereupon into an electrical signal and being in a differential relationship with the photocell 12 (the electrical connection will be described below in greater detail). The difference in the electrical signals produced by the photocells 12 and 13 is representative of the measurand. The plane in which lie the optical axes of the channels 14 and 15 is normal to the transparent sides 5 and 6 (the optical axes of the channels are almost normal to the faces 5 and 6).

Used as the light source 1 may be any light emitter. Most suitable for the purpose is a semiconductor emitter diode (photodiode) owing to its high vibration resistance and small size.

The polarizers 2, 3 and analyzers 10, 11 may be similar in construction, for example, they may be cut out of a specially treated polyvinyl alcohol film which converts the light passing therethrough into linearly polarized light. Such films are known as polaroids. To obtain maximum sensitivity, the polarization plane (indicated in the drawing by a two-pointed arrow) of the polarizers and analyzers in the transducer of FIG. 1 as well as in all other embodiments of transducers described below makes an angle of ±45° with the vector of maximum or minimum normal stress in the elastic element 4, perpendicular to the luminous flux. By the polarization plane is here meant the plane normal to the polaroid plane, in which lies the vector of the linear polarized light passed by the polaroid. Since the stressed state in the illuminated area may be assumed uniform and uniaxial, the maximum normal stress being parallel to the force N, the polarization planes of the polarizers 2, 3 and analyzers 10, 11 are inclined at an angle of ±45° to the vector of the force N converted whereinto is the measurand.

The elastic element 4 is made from a solid transparent material, such as silicate glass. Use may also be made of certain single crystals exhibiting a substantially more pronounced piezo-optic effect and a higher elastic modulus, which permits a substantial increase in the sensitivity and natural frequency of the transducer.

The phase-shifting plates 8 and 9 are made from a birefringent material, such as mica. They are intended to shift working points of the polarization-optical channels towards steeper and more rectilinear portions of their static characteristic curves (luminous flux magnitude at the outputs of the channels versus force N) having a sinusoidal shape. Consider this in more detail. Every phase-shifting plate is characterized by the phase difference ($\alpha$) produced thereby as well as by the axes of maximum velocity (F) and minimum velocity (S), the directions whereof are shown by arrows. By the maximum velocity axis F is meant the direction of the light vector of a wave whose speed of propagation through the plate is maximum. Similarly, the minimum velocity axis S is the direction of the light vector of a wave whose speed of propagation through the plate is minimum. The axes F and S for the same plate are mutually perpendicular. To obtain a maximum sensitivity of the piezo-optic transducer, the axes F and S of the phase-shifting plates 8 and 9 in the embodiment of FIG. 1 as well as in all other embodiments described below must be parallel to the normal stresses perpendicular to the luminous flux and caused in the elastic element by the measurand which is converted into the force N. Since one of the normal stresses in the elastic element is parallel to the vector of the force N, in the transducer of FIG. 1, as well as in all other transducers described herein below, the planes of polarization of the polarizers and analyzers making, as has been mentioned above, angles of ±45° with the vector of the force N, also make the same angles with the maximum and minimum velocity axes F and S, respectively, of the phase-shifting plates. The signs of the angles in each particular case can be determined by the mutual orientation of the polarization planes of the polarizers and analyzers and the maximum and minimum velocity axes F and S of the phase-shifting plates, whose directions are, as has been mentioned above, indicated by arrows on the polarizers, analyzers and phase-shifting plates in all figures.

The phase difference $\alpha$ produced by each one of the phase-shifting plates 8 and 9 is equal to $\pi/2(2n-1)$ radians, wherein $n$ is a natural number and $\pi = 3.14\ldots$ In addition, the phase-shifting plates in the transducer of FIG. 1 as well as in some other transducers described herein below are used as means for varying the intensity of the luminous flux in the additional polarization-optical channel 15 (incident upon the photocell 13), which intensity variation is opposite in polarity to that in the luminous flux in the main polarization-optical channel 14 (incident upon the photocell 12). This is achieved by that the phase-shifting plates 8 and 9 placed between the polarizer 2 and analyzer 10 in the main channel 14 and between the polarizers 3 and analyzer 11 in the additional channel 15 are arranged so that the like optical axes F and S thereof are parallel, while the phase angles differ by an angle $n\pi$ wherein $n$ is an odd integer and $\pi = 3.14\ldots$. The difference in the phase angles of the phase-shifting plates is attained by the plate 9 being made thicker than the plate 8 and by making the angular phase difference $\alpha_{02}$ introduced by this plate into the portion B of the luminous flux incident on the photocell 13 greater by $\pi$ radians than the initial angular phase difference $\alpha_{01}$ introduced by the plate 8 into the light beam A incident upon the photocell 12 (here, $n = 1$). As far as the value $\alpha_{01}$ is concerned, it should preferably be selected close to $\pi/2$. In the diagram of FIG. 1, the polarization planes of the polarizers 2 and 3 are parallel and normal to those of the analyzers 10 and 11, i.e. in both channels, the polarization planes of the polarizers and analyzers are mutually perpendicular.

Figure 2:
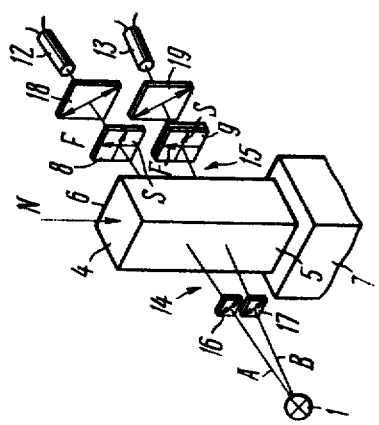
FIG. 2 is an optical diagram of the transducer of FIG. 1, in which the polarization planes of the polarizers and analyzers are parallel.

The transducer of FIG. 2 differs from that of FIG. 1 in that the polarization planes of polarizers 16 and 17 are parallel to those of analyzers 18 and 19. Such an embodiment of the piezo-optic measuring transducer is similar to that of the transducer shown in FIG. 1.

Figure 3:
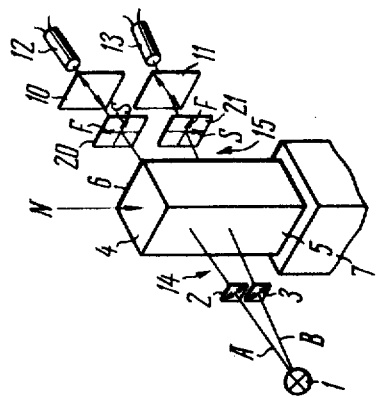
FIG. 3 is an optical diagram of a piezo-optic measuring transducer, according to the invention, with phase-shifting plates whose like optical axes are mutually perpendicular as well as with polarizers and analyzers the polarization planes whereof are mutually perpendicular.

The transducer the optical diagram whereof is shown in FIG. 3 differs from that of FIG. 1 in that it is provided with phase-shifting plates 20 and 21 creating the same phase shift $\alpha_0$ at the output, which should also be preferably selected equal to $\pi/2$. Similarly to the transducer of FIG. 1, in this case the polarization planes of the polarizers 2 and 3 are parallel, too, but normal to those of the analyzers 10 and 11. The axis F of maximum velocity of the phase-shifting plate 20 arranged in the polarization-optical channel 14 is parallel to the vector of the force N, while in the other polarization-optical channel 15, the axis F of the phase-shifting palet 21 is normal to the vector of the force N.

Figure 4:
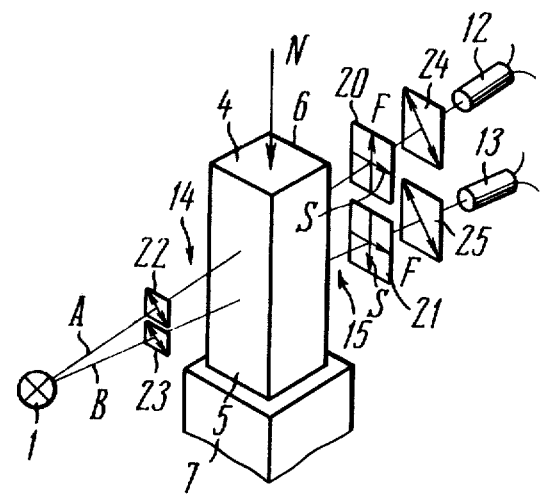
FIG. 4 is an optical diagram of the transducer of FIG. 3, in which the polarization planes of the polarizers and analyzers are parallel.

The difference between the transducers shown in FIGS. 4 and 3 resides in that the polarization planes of polarizers 22 and 23 are parallel to those of analyzers 24 and 25. Thus, this embodiment is similar to that of FIG. 3.

Figure 5:
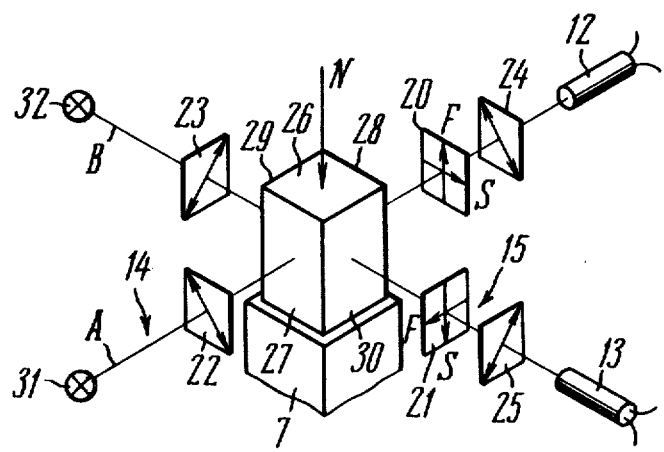
FIG. 5 is an optical diagram of the transducer of FIG. 4, in which the optical axes of the polarization-optical channels are mutually perpendicular.

The transducer of FIG. 5 is similar to that of FIG. 4 the only difference being that its elastic element 26 is made in the form of a right prism with four transparent faces 27, 28 and 29, 30, each one of the polarization-optical channels 14 and 15 being provided with a light source 31 and 32, respectively, and the optical axes of both channels 14 and 15 are mutually perpendicular as well as normal to the transparent faces 27, 28 and 29, 30, respectively. Such an embodiment of the optical system enables the height of the elastic element 26 to be reduced, thereby increasing its rigidity in the direction of the force N, hence, increasing the natural frequency of mechanical vibration.

Figure 6:
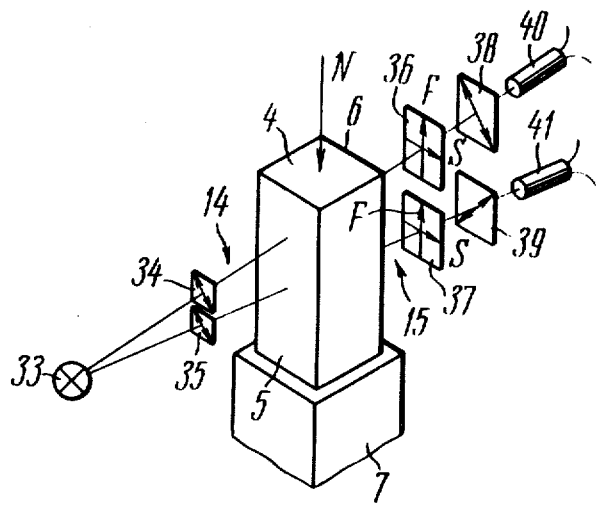
FIG. 6 is an optical diagram of a piezo-optic measuring transducer, according to the invention, in which the like optical axes of phase-shifting plates are parallel, the polarization planes of the polarizer and analyzer of one polarization-optical channel are parallel, while those of the polarizer and analyzer of the other channel are mutually perpendicular.

The piezo-optic measuring transducer of FIG. 6 comprises a light source 33 in both polarization-optical channels 14 and 15, as well as the following components arranged downstream of the light source along the luminous flux: polarizers 34 and 35, an elastic element 4, similarly oriented phase-shifting plates 36 and 37 characterized by the same phase shift, analyzers 38, 39 and photocells 40, 41. In this embodiment, the polarizer 34 and analyzer 38 of the main polarization-optical channel 14 are arranged so that their polarization planes are parallel, while those of the polarizer 35 and analyzer 39 in the additional polarization-optical channel 15 are mutually perpendicular. In this case, used as the means for varying the intensity of the luminous flux in the additional polarization-optical channel 15, which variation is opposite in polarity to that in the luminous flux through the main polarization-optical channel 14, are the polarizers 34, 35 and analyzers 38, 39.

Figure 7:
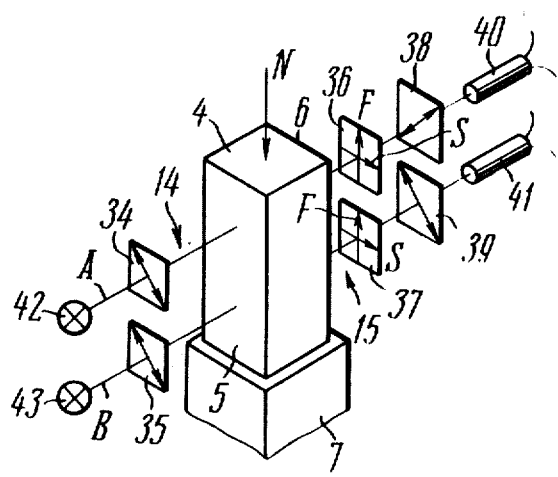
FIG. 7 is an optical diagram of the transducer of FIG. 6, in which the optical axes of both polarization-optical channels are parallel.

The piezo-optic measuring transducer of FIG. 7 differs from that represented in FIG. 6 in that each one of its polarization-optical channels 14 and 15 has an individual light source 42 and 43, respectively, the optical axes of these channels being mutually perpendicular and normal to the transparent faces 5 and 6.

The polarization planes of the polarizer 34 (FIG. 7) and analyzer 38 in the main polarization-optical channel 14 are mutually perpendicular, while those of the polarizer 35 and analyzer 39 in the additional polarization-optical channel 15 are parallel.

Figure 8:
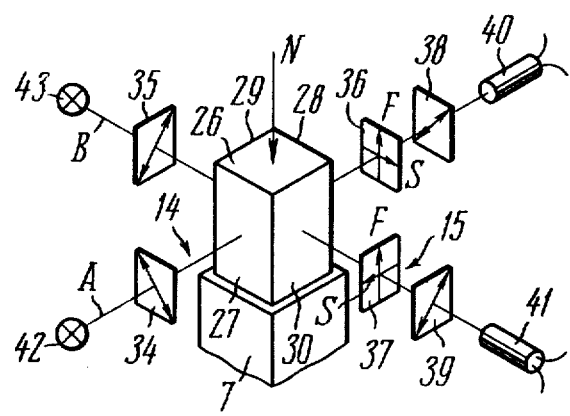
FIG. 8 is an optical diagram of the transducer of FIG. 6, in which the optical axes of both polarization-optical channels are mutually perpendicular.

The piezo-optic measuring transducer shown in FIG. 8 is similar to that of FIG. 7 the only difference being that used therein is the elastic element 26 of FIG. 5, the optical axes of each one of the polarization-optical channels 14 and 15 (FIG. 8) being perpendicular to each other and to the transparent faces 27, 28 and 29, 30, respectively.

In each one of the above-described embodiments of the proposed transducer (FIGS. 1 to 8), the photocells of the main and additional polarization-optical channels are arranged in a differential relationship which will be discussed below with reference to the transducer of FIG. 1.

The proposed transducer may have an embodiment in which an elastic element 44 (FIG. 9) is made in the form of a right octahedral prism with transparent faces 45, 46, 47, 48, 49, 50, 51 and 52 arranged in pairs. The elastic element 44 is mounted on a support member 53.

In this embodiment, there are two groups of polarization-optical channels: 54, 55 (main) and 56, 57 (additional), including, respectively, light sources 58, 59 and 60, 61, as well as the following components arranged downstream of the light sources along the luminous fluxes (A and B): polarizers 62, 63, 64, 65, the elastic element 44, phase-shifting plates 66, 67, 68, 69, analyzers 70, 71, 72, 73 and photocells 74, 75, 76, 77 converting the light incident thereupon into electrical signals.

In the example under consideration, the phase-shifting plates 66, 67, 68 and 69 are similar in structure and orientation and characterized by a phase angle $\alpha_0 = \pi/2$. The polarizers 62, 63, 64 and 65 are orinted similarly, too. Used as the means for varying the intensity of the luminous flux in the group of additional polarization-optical channels 56 and 57, which variation is opposite in polarity to that in the luminous flux through the group of main polarization-optical channels 54 and 55, is the arrangement in which the analyzers 72, 73 of the additional channels have their polarization planes normal to those of the polarizers 64, 65 of these channels, while the polarization planes of the analyzers 70, 71 of the main channels are parallel to those of the polarizers 62, 63 of these channels. Each one of the main polarization-optical channels 54 and 55 is similar to the channel 14 of FIG. 8, while the additional polarization-optical channels 56 and 57 are similar, each, to the channel 15 of FIG. 8. The polarization-optical channels may also be embodied as follows:

a. the channels of the main group are similar to the channel 14 of FIG. 1, while the channels of the additional group are similar to the channel 15 of FIG. 1;

b. the channels of the main group are similar to the channel 14 of FIG. 2, while the channels of the additional group are similar to the channel 15 of FIG. 2;

c. the channels of the main group are similar to the channel 14 of FIG. 3, while the channels of the additional group are similar to the channel 15 of FIG. 3;

d. the channels of the main group are similar to the channel 14 of FIG. 4, while the channels of the additional group are similar to the channel 15 of FIG. 4.

In the case where the measurand is too small, use should preferably be made of piezo-optic measuring transducers with the elastic element being made in the form of a beam, from a piezo-optic element, subject to bending. For example, in the transducer of FIG. 10, there is an elastic element 78 made in the form of a cantilever beam fixed in a support 79 and having two parallel transparent faces 80 and 81. The force N proportional to the measurand is applied to the free end of the beam. The beam A from a light source 82 in a main polarization-optical channel 83 passes partially through the following components arranged in series: a polarizer 84, the elastic element 78, a phase-shifting plate 85, and an analyzer 86, towards a photocell 87. The beam B from the light source 82 in an additional polarization-optical channel 88 passes through the same elements towards a photocell 89. The optical axes of the channels 83 and 88 are almost normal to the faces 80, 81 and pass through the elastic element 78, being spaced a distance $h$ apart, on either side of a neutral plane 90 of the elastic element 78. Preferably, they should be at equal distances ($h/2$) from the neutral plane 90. The polarizer 84, analyzer 86 and phase-shifting plate 85 are common for both channels 83 and 88, i.e. the polarizers, analyzers and phase-shifting plates of the main and additional polarization-optical channels are made as signle components.

In this embodiment, the function of the means for varying the intensity of the luminous flux in the additional polarization-optical channel 88, which variation is opposite in polarity to that in the luminous flux through the main channel 83, is performed by the elastic element 78.

The photocells 87 and 89 are arranged in a differential relationship. This arrangement will be described in greater detail with reference to the embodiment of FIG. 1 owing to the similarly of these arrangements in both embodiments.

Figure 11:
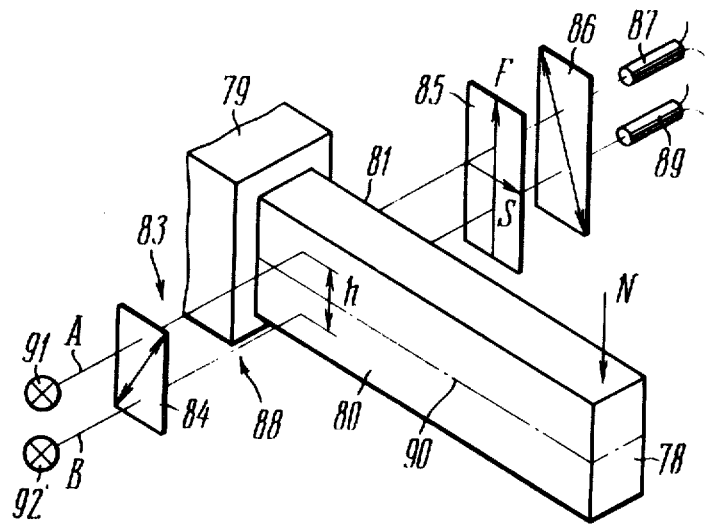
FIG. 11 is an optical diagram of the transducer of FIG. 10, in which the optical axes of both polarization-optical channels are parallel.
Figure 10:
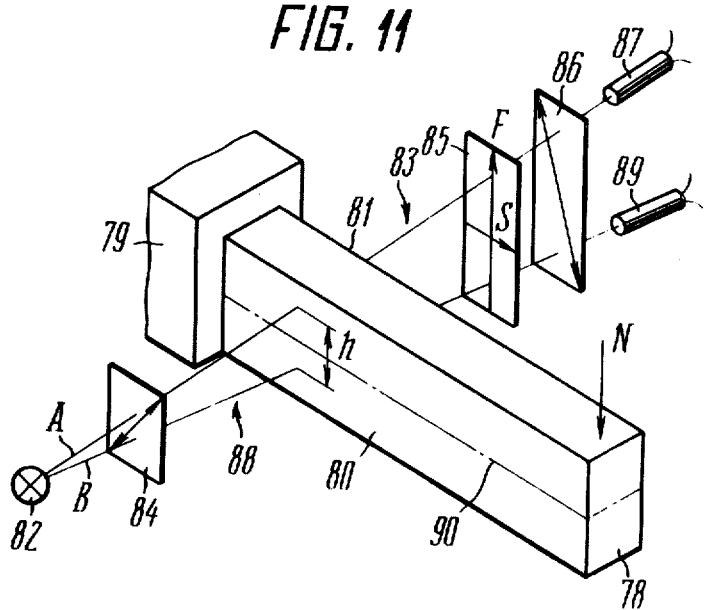
FIG. 10 is an optical diagram of a piezo-optic measuring transducer, according to the invention, with an elastic element in the form of a beam.

The transducer of FIG. 11 is similar to that of FIG. 10 with the difference that each polarization-optical channel 83 and 88 has its own light source 91 and 92, respectively, as a result of which the optical axes of the channels 83 and 88 are parallel and normal to the transparent faces 80 and 81 of the elastic element 78 and can be spaced a greater distance h apart, whereby the sensitivity of the transducer is substantially enhanced.

The elastic element 78 in both embodiments (FIGS. 10 and 11) can be made of metal with an insert made from a piezo-optic material being bonded or attached in any convenient manner to the beam over a small section in the zone of passage of the luminous flux.

As can be inferred from the description of all the above transducer arrangements, the terms "main" and "additional" as applied to the polarization-optical channels are used arbitrarily since any one of these channels may serve as main and additional.

The polarizers of the main and additional polarization-optical channels in the proposed transducer can be made as individual components or as a single whole, provided their polarization planes are parallel.

The analyzers of the main and additional polarization-optical channels in the proposed transducer can also be made as individual components or a single whole provided their polarization planes are parallel.

The phase-shifting plates of the main and additional polarization-optical channels in the transducer disclosed herein can be made as individual components or as a single piece provided the maximum and minimum velocity axes F and S, respectively, of the phase-shifting plate in one polarization-optical channel are parallel to respective axes of that in the other channel.

In a transducer whose polarizers and analyzers are not used as the means for varying the intensity of the luminous flux in the additional polarization-optical channel, which variation is opposite in polarity to that in the luminous flux through the main polarization-optical channel, their polarization planes in both channels may be parallel or mutually perpendicular. On the other hand, in a transducer whose polarizers and analyzers are used as said means, their polarization planes in the main polarization-optical channels are mutually perpendicular, while in the additional channel they are parallel, or vice versa.

These possible combinations can be advantageously used in any embodiment of the proposed transducer for effecting the required piezo-optic conversions. Those combinations that were not mentioned in the present description of piezo-optic measuring transducers are not shown in drawings either due to the obviousness of their principle of operation.

Figure 12:
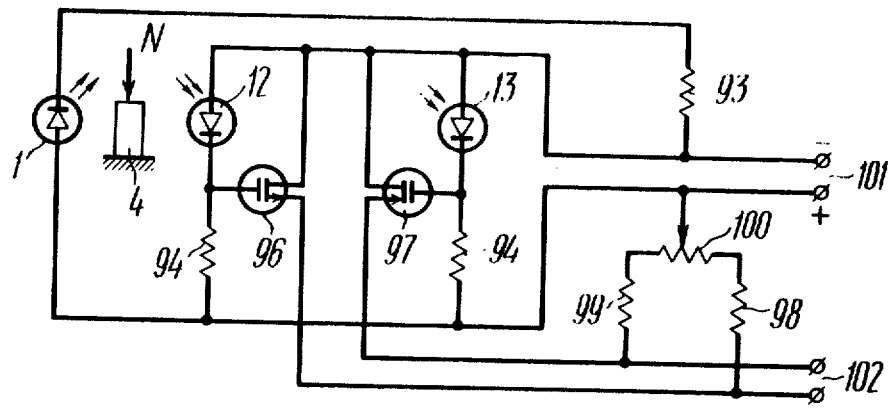
FIG. 12 is an electric circuit diagram of the transducer of FIG. 1.

Represented in FIG.12 is an electric circuit diagram showing the arrangement of the photocells 12 and 13 (FIG.1) in a differential relationship (the arrangements of the photocells in other embodiments are not shown because of their similarity with the exception of those in the transducers shown in FIGS 5, 7, 9 and 11).

The light source 1 (FIG.12) is a gallium arsenide photodiode. To limit the current through the photodiode, its circuit includes a resistor 93. The two differentially arranged photocells 12 and 13, which are silicon photodiodes, operate as diodes. Connected to photodiode load resistors 94 and 95 are transistors 96 and 97 making up a differential follower intended to reduce the output resistance of the transducer. Connected to the transistors 96 and 97 are resistors 98 and 99. A variable resistor 100 serves to balance the transducer. Terminals 101 are intended for connection to a power supply (not shown), while terminals 102 are for the transducer output signal.

Figure 13:
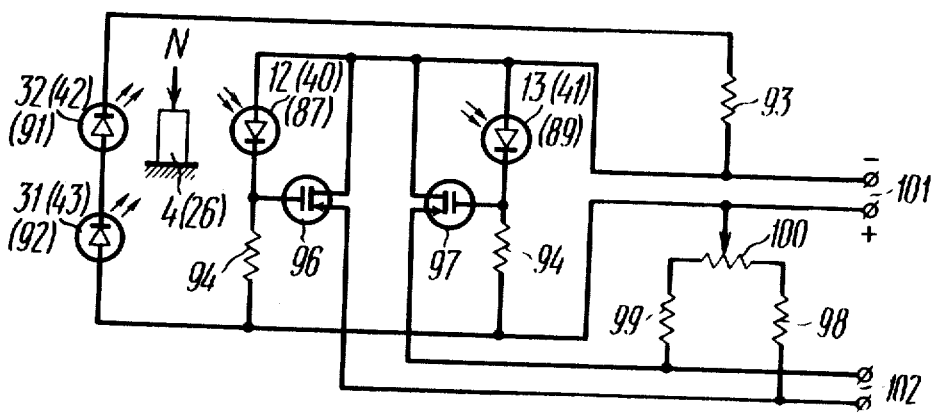
FIG. 13 is an electric circuit diagram of the transducer of FIG. 5 (7, 11)

For the differential arrangement of the photocells 12, 13 of the transducer of FIG.5, photocells 40, 41 of the transducer of FIG.7, and photocells 87, 89 of the transducer of FIG.11 see the diagram of FIG.13.

Figure 9:
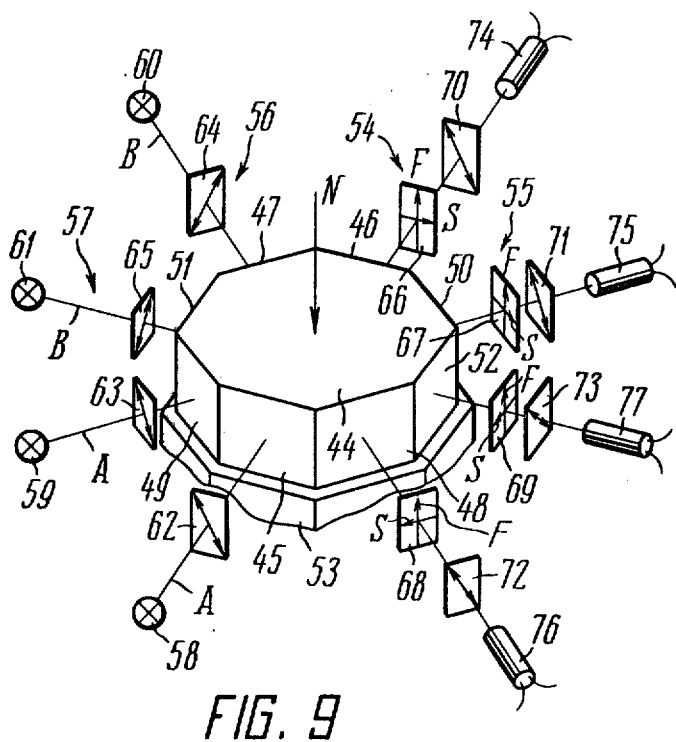
FIG. 9 is an optical diagram of a piezo-optic measuring transducer, according to the invention, with two pairs of polarization-optical channels.
Figure 14:
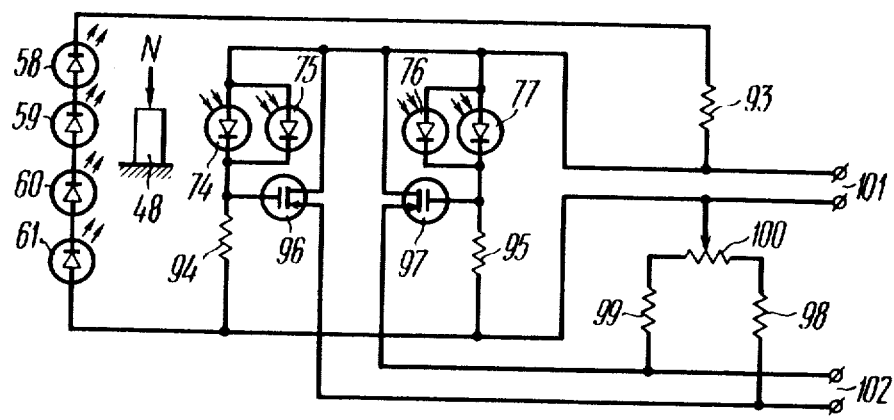
FIG. 14 is an electric circuit diagram of the transducer of FIG. 9.

The differential arrangement of the photocells 74, 75, 76 and 77 of the transducer of FIG.9 is illustrated in FIG.14. The difference between the arrangements of FIGS 13 and 14, on the one hand, and FIG.12, on the other, resides only in the number of light sources and photocells.

To stabilize the sensitivity coefficient of the proposed transducer, it is provided with a sensitivity stabilizing circuit.

The sensitivity stabilizing circuit can be used in any one of the above-described embodiments of the piezo-optic measuring transducer according to the invention, however, for simplicity, considered below will be only the circuit for the transducer of FIG.1. The circuit includes an adder 103 (FIG.15) connected to the inputs whereof are the photocells 12 and 13, a comparison unit 104 having its first input connected to the output of the adder 103, a source 105 of reference voltage, coupled to the second input of the comparison unit 104, and a controlled power supply 106 whose input is connected to the output of the comparison unit 104 and whose output is connected to the light source 1.

The adder 103 (FIG.16) is an adjustable resistor.

The comparison unit 104 comprises a circuit built around two transistors 107 and 108 whose emitters are connected via a resistor 109 and a capacitor 110 to the "+" terminal 101 of the power supply, while the collectors of these transistors are connected to the "−" terminal 101 of the power supply, the transistor 107 being coupled to the − terminal 101 via a resistor 111. The base of the transistor 107 is connected to the cursor of the resistor which performs the function of the adder 103, while the base of the transistor 108 is connected to the cursor of an adjustable resistor 112 forming part of the reference voltage source 105.

The reference voltage source 105 includes the adjustable resistor 112, a resistor 113 and a Zener diode 114. The resistor 113 and Zener diode 114 are connected in series with the terminals 101 of the power supply, the resistor 113 being coupled to the − terminal and the Zener diode 114 being connected to the + terminal. One end of the resistor 112 is connected to the common point of the connection between the resistor 113 and Zener diode 114, while its other end is connected to the + terminal 101 of the power supply.

The controller power supply 106 is built around transistors 115 and 116. The base of the transistor 115 is connected to the collector of the transistor 107 in the comparison unit 104, while the collector is connected to the − terminal 101 of the power supply. The base of the transmitter 116 is connected to the emitter of the transistor 115, while the collector is connected to the − terminal 101 of the power supply, and the emitter is connected to the light source 1 via a resistor 117.

Figure 15:
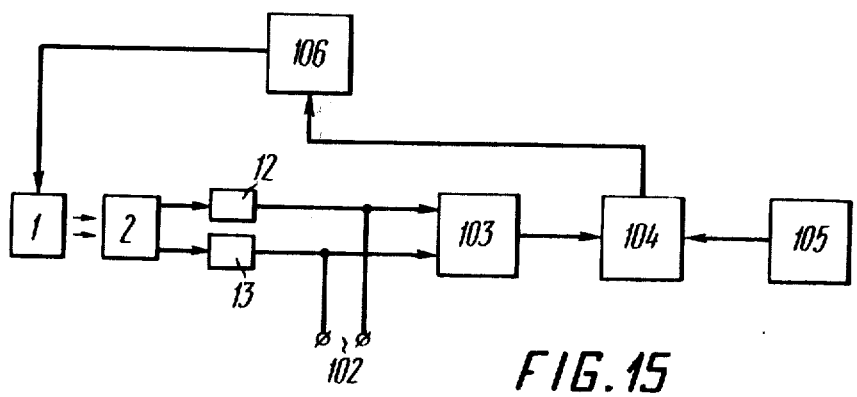
FIG. 15 is a block diagram of the electrical part of the transducer of FIG. 1.

The circuitry of the electrical part of the transducer of FIG.1, shown in FIG.17, is similar to that of FIG.15. There is a difference, though, residing in that it is additionally provided with a circuit for zero temperature drift compensation of the transducer output signal, in the form of a source 118 of a compensating signal, having its input conneted to the controlled power supply 106, one of its outputs connected to the light source 1, and the other two outputs connected to the transducer output signal terminals 102.

This source 118 (FIG. 18) includes adjustable resistors 119 and 120 with interconnected cursors, as well as resistors 121 and 122. The ends of the adjustable resistor 119 are connected to the output of the controlled power supply 106 and to the input of the light source 1. The adjustable resistor 120 has its ends connected, via the resistors 121 and 122, to the transducer output signal terminals 102. The circuit for zero temperature drift compensation of the output signal can be used in any one of the piezo-optic transducers shown in FIGS. 1 to 11.

Any one of the above-described piezo-optic transducer arrangements (FIGS. 1 to 11) and the electric circuits used therein can be used as the basic element of devices for measuring various mechanical parameters, such as accelerometers, pressure gauges, dynamometers and thermometers.

Shown in FIGS. 19 and 20 is an accelerometer designed for measuring one of the components of linear acceleration, in which any one of the transducers shown in FIGS. 1 to 9 can be used. Used in this particular embodiment of the accelerometer is the transducer of FIG.5. The electronic part of this accelerometer is arranged in accordance with the electric circuit diagram of FIG. 13.

The elastic element 26 (FIGS. 19 and 20) of the accelerometer is made in the form of a parallelepiped wherein bonded to the middle portions of the transparent faces 27, 28, 29 and 30 (FIG.20) are the phase-shifting plates 20, 21, polarizers 22, 23 and analyzers 24, 25, oriented as shown in FIG.5. One end portion of the elastic element 26 is secured in a recess made in a base 123 (FIG.19), while the other end portion is secured in a recess made in a mass 124. The centre of gravity of the mass 124 lies on an axis 125 of symmetry of the elastic element 26, parallel to its face 27 through 30 (FIG.20). Attached to the mass 124 (FIG.19) are diaphragms 126 and 127 normal to the axis 125 of symmetry.

The components 20, 21, 22, 23, 24, 25, 26, 123, 124, 126 and 127 make up an assembly which is secured, with the diaphragms 126, 127 and base 123, in cylindrical holes made in a housing 128, the axes of these holes coinciding with the axis 125 of symmetry of the elastic element 26. Also made in the housing 128 are four holes coaxially arranged in pairs, whose axes 129 and 130 (FIG.20) are normal, respectively, to the transparent faces 27, 28 and 29, 30 of the elastic element 26 and cross in the centre thereof. The axes 129 and 130 coincide with the axes of the light beams A and B, respectively, through the polarization-optical channels 14 and 15 (FIG.5).

Received in the holes of the housing 128 (FIG.20), along the axis 129, are the light source 31 and photocell 12, while in the holes along the axis 130, there are received the light source 32 and photocell 13. Recesses made in the housing 128 receive the transistors 96 and 97 with the resistors 94 and 95 arranged in proximity thereto.

The elements of the circuit of FIG.13 are arranged inside the housing 128 of the accelerometer to broaden its frequency range, as they eliminate the damping effect of a cable 135 through which power is supplied to the accelerometer and the output signal is taken out. The accelerometer is protected against mechanical damage and penetration of moisture by means of a cover 136 (FIG.19). Provided in the bottom portion of the cover is a hole with a threaded plug 137. Screwed into a threaded hole 138 made in the mass 124 of the accelerometer is a member (not shown) to which a load is applied for calibrating the accelerometer.

Linear acceleration is measured in the direction indicated by arrow 139. A threaded hole 140 is used for coupling the accelerometer to the object of measurement.

Figure 21:
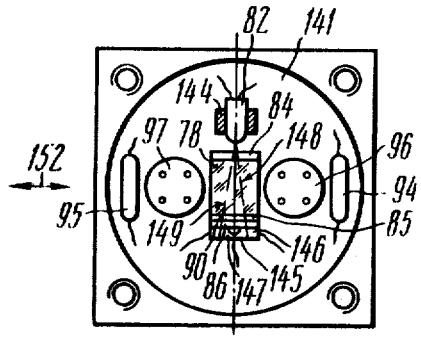
FIG. 21 is a longitudinal section view of an accelerometer based on the transducer of FIG. 10.
Figure 22:
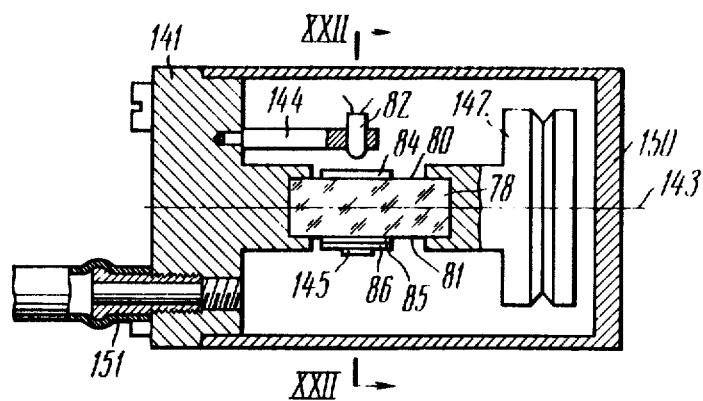
FIG. 22 is a view taken along line XXII—XXII of FIG. 21.

Shown in FIGS. 21 and 22 is another accelerator embodiment in which use is made of the transducer of FIG.12. In this case, the electric part is arranged as shown in FIG.12.

The elastic element 78 (FIGS. 21 and 22) of the accelerometer is made from a transparent material in the form of a beam of rectangular cross section, having one of its ends bonded to a base 141 (FIG.21) and the other end bonded to a mass 142. Two side faces 80 and 81 of the elastic element 78 are made transparent. The centre of gravity of the mass 142 lies on an axis 143 of symmetry of the elastic element 78, which coincides with its neutral plane 90 (FIG.22). Bonded to the middle portion of the transparent face 80 (FIG.21) is the polarizer 84, while bonded to the middle portion of the transparent face 81 are the phase-shifting plate 84 and, on top, analyzer 86. The polarization planes of the polarizer 84, analyzer 86 as well as maximum and minimum velocity axes F and S, respectively, of the phase-shifting plate 85 are oriented relative to the neutral plane 90 (FIG.22) of the elastic element 78 as shown in FIG.10. The components 84, 78, 85 and 86 (FIG. 22) are transilluminated, in that order, by the luminous flux from the light source 82 secured on a bracket 144. Bonded on top of the analyzer 86 is a flat differential photocell 145 having two photosensitive layers 146 and 147. As shown in FIG.22, the polarizer 84, the right (with respect to the neutral plane 90) portion of the elastic element 78, phase-shifting plate 85, and analyzer 86 make up a polarization-optical channel 148 similar to the polarization-optical channel 83 of FIG.10. Through this polarization-optical channel 148 (FIG.22), the light beam A from the source 82 is incident on the photolayer 146 of the differential photocell 145. The polarizer 84, the left portion of the elastic element 78, and phase-shifting plate 85 make up a polarization-optical channel 149 similar to the polarization-optical channel 88 shown in FIG.10. Through the channel 149 (FIG.22), the light beam B from the source 82 is incident on the photolayer 147 of the differential photocell 145.

Recesses made in the base 141 accommodate the transistors 96 and 97 with the resistors 94 and 95 of the electrical part of the transducer, as shown in FIG.12, being arranged in proximity thereto. The accelerometer is protected against mechanical damage and penetration of moisture by a cover 150 (FIG.21). The base 141 is provided with a sleeve 151 for a cable (not shown). The direction of the acceleration being measured is indicated by arrow 152 (FIG.22).

Figure 23:
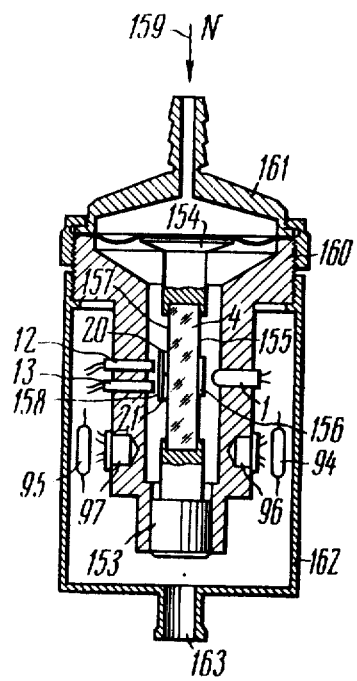
FIG. 23 is a longitudinal section view of a pressure gauge based on the transducer of FIG. 4.

FIG.23 shows a pressure gauge in which use can be made of any one of the piezo-optic transducers of FIGS 1 to 9.

In the pressure gauge illustrated in FIG.23, use is made of the piezo-optic transducer of FIG.4 with the difference that its polarizers, on the one hand, and analyzers, on the other, are made as single pieces. The electrical part of the pressure gauge is as shown in

FIG. 12.

The elastic element 4 (FIG. 23) of the pressure gauge is made in the form of a rectangular parallelepiped one end portion whereof is secured in a base 153 of the pressure gauge, while the other end portion is secured in the thicker central portion of a diaphragm 154. Bonded to the middle portion of a transparent face 155 of the elastic element 4 is a polarizer 156, while bonded to the middle portion of a transparent face 157 are the phase-shifting plates 20, 21 and, on top, an analyzer 158. The polarization planes of the polarizer 156, analyzer 158, as well as maximum and minimum velocity axes F and S, respectively, of the phase-shifting plates 20 and 21 are oriented with respect to the vector of the pressure force N indicated by arrow 159 similarly as the polarizers 22, 23, analyzers 24, 25, and phase-shifting plates 20, 21 with respect to the vector of the force N in FIG. 4.

The components 4, 20, 21, 156, 158, 153 and 154 make up an assembly which is secured, with the base 153 and diaphragm 154, in holes made in a housing 160. Other holes made in the housing 160 receive the light source 1 and photocells 12 and 13 so that the portion of the luminous flux from the source 1, passing through the polarizer 156, elastic element 4, phase-shifting plate 20 and analyzer 158, is incident on the photocell 12 similarly to the light beam A of FIG. 4 passing through the polarization-optical channel 14, while the other portion of the luminous flux from the source 1, passing through the polarizer 156, elastic element 4, phase-shifting plate 21 and analyzer 158, is incident upon the photocell 13 similarly to the light beam B of FIG. 4 passing through the polarization-optical channel 15. Accommodated in the housing 160 (FIG. 23) are the transistors 96, 97 and resistors 94, 95 of the electrical part of the transducer of FIG. 12. A cover 161 with a union, screwed onto the housing 160 above the diaphragm 154, is used for applying therethrough the pressure being measured to the diaphragm 154. The pressure gauge is protected against mechanical damage and penetration of moisture by means of a case 162. A sleeve 163 on the case 162 is for an electrical cable (not shown).

Shown in FIGS. 24 and 25 is a pressure gauge using the piezo-optic transducer of FIGS. 10 and 11. In the pressure gauge under consideration, use is made of the transducer of FIG. 10 and circuitry of FIG. 12.

The elastic element 78 of the pressure gauge of FIGS. 24 and 25 is made in the form of a beam of rectangular cross section, one end portion whereof is secured in a base 164 (FIG. 24). Attached to the other end portion of the elastic element 78 is an arm 165. The base 164 is secured to a housing 166. The free end of the arm 167 is linked through a rod 167 with a disc 168 of a diaphragm 169 whose edges are soldered to a gasket 170. The gasket 170 together with a head 171 made from a transparent material are screwed at 172 to the housing 166. Pressure is applied into a cavity 173 of the head 171 through unions 174 and 175.

Bonded to the middle portion of the transparent face 80 (FIG. 25) of the elastic element 78 is the polarizer 84, and bonded to the middle portion of the transparent face 81 are the phase-shifting plate 85 and, on top, analyzer 86. The polarization planes of the polarizer 84, analyzer 86, as well as maximum and minimum velocity axes F and S, respectively, of the phase-shifting plate 85 are oriented with respect to the neutral plane 90 of the elastic element 78 as shown in FIG. 10. The components 84, 78, 85 and 86 (FIG. 25) are transilluminated, in that order, by the luminous flux from the light source 82 secured in a hole made in the housing 166. The photocells 87 and 89 are secured in the housing 166 in front of the analyzer 86.

The polarizer 84, the left (with respect to the neutral plane 90) portion of the elastic element 78, phase-shifting plate 85 and analyzer 86 make up a polarization-optical channel similar to the polarization-optical channel 86 of FIG. 10. The polarizer 84 (FIG. 25), the right portion of the elastic element 78, phase-shifting plate 85 and analyzer 86 make up another polarization-optical channel similar to the channel 88 of FIG. 10.

Cap nuts 176, 177 (FIG. 24) and 178, 179 (FIG. 25) plug auxiliary holes made in the housing 166. A sleeve 180 (FIG. 24) has been provided for a cable (not shown). The electric circuit components, with the exception of the light source 82 and photocells 87, 89, are brought out of the pressure gauge.

FIGS. 26 and 27 illustrate a dynamometer for measuring force. Used therein can be any one of the transducers shown in FIGS. 1 to 9.

In the dynamometer shown in FIGS. 26 and 27, use is made of the piezo-optic transducer of FIG. 8 and circuitry of FIG. 13.

The elastic element 26 (FIG. 26) of the dynamometer is made in the form of a rectangular parallelepiped with the polarizers 34 and 35 being bonded to the middle portions of its transparent faces 27 and 29 (FIG. 27) and the phase-shifting plates 36 and 37 with the analyzers 38 and 39 being bonded to the middle portions of the transparent faces 28 and 30, respectively. In the dynamometer of FIGS. 26 and 27, the polarization planes of the polarizers 34, 35, analyzers 38, 39, as well as maximum and minimum velocity axes F and S, respectively, of the phase-shifting plates 36 and 37 are oriented with respect to the force N as shown in FIG. 8.

One end portion of the elastic element 26 (FIG. 26) is secured in a base 181, while the other end portion is secured in a journal 182 associated with a diaphragm 183. The components 26, 34, 35, 36, 37, 38, 39, 181, 182 and 183 make up an assembly which is secured, with the base 181 and diaphragm 183, in a housing 184. The diaphragm 183 is urged against the housing 184 by a ring 185 and screws 186. The point of application of the force N to the journal 182 lies on an axis 187 of symmetry of the elastic element 26, which axis is parallel to its transparent faces 27, 28, 29 and 30 (FIG. 27). Made in the housing 184 are four holes coaxially arranged in pairs, axes 188 and 189 whereof are normal, respectively, to the transparent faces 27, 28 and 29, 30 of the elastic element 26 and cross in its centre. The axes 188 and 189 coincide with the axes of the beams A and B, respectively, through the polarization-optical channels 14 and 15 of FIG. 8.

The holes along the axis 188 in the housing 184 (FIG. 27) receive the light source 42 and photocell 40, while the holes along the axis 189 receive the light source 43 and photocell 41. Recesses made in the housing 184 receive the transistors 96 and 97 together with the resistors 94, 95 of the electrical part of the transducer of FIG. 13. A sleeve 190 is provided for an electrical cable (not shown). Threaded holes 191 and 192 (FIG. 26) in the housing 184 are provided for attachment of the dynamometer.

In FIGS. 28 and 29, there is shown a dynamometer in which use may be made of the piezo-optic transducers of FIGS. 10 and 11. In this particular dynamometer, use is made of the piezo-optic transducer of FIG. 10 and circuitry of FIG. 12.

The dynamometer of FIG. 28 has an elastic element 193 made in the form of a beam rectangular in cross section. One end portion of the elastic element 193 is secured in a base 194, while its other end portion is fixed to an arm 195. The base 194 is secured to a housing 196. Applied to the free end of the arm 195 is the force N being measured whose vector is indicated by arrow 197. The cavity of the housing 196 is protected by a flexible tubular member 198 made, for example, from rubber.

Bonded to the middle portion of the transparent face 80 (FIG. 29) of the elastic element 193 is the polarizer 84, while bonded to the middle portion of the transparent face 81 are the phase-shifting plate 85 and, on top, analyzer 86. The polarization planes of the polarizer 84, analyzer 86, as well as the maximum and minimum velocity axes F and S, respectively, of the phase-shifting plate 85 are oriented with respect to the neutral plane 90 of the elastic element 193 as shown in FIG. 10.

The components 84, 193, 85 and 86 (FIG. 29) are transilluminated, in that order, by the luminous flux from the light source 82 accommodated in a recess made in the housing 196. The photocells 87 and 89 are disposed in the housing 196 in front of the analyzer 86.

The polarizer 84, one part of the elastic element 193 on one side of its neutral plane 90, phase-shifting plate 85 and analyzer 86 make up a polarizaton-optical channel similar to the polarization-optical channel 83 of FIG. 10. The polarizer 84 (FIG. 29), the other part of the elastic element 193 on the other side of its neutral plane 90, phase-shifting plate 85 and analyzer 86 form another polarization-optical channel similar to the channel 88 shown in FIG. 10.

Cap nuts 199 and 200 (FIG. 29) plug holes made in the housing 196. A sleeve 201 (FIG. 28) is provided for an electrical cable (not shown). All the components of the circuit shown in FIG. 12, except for the light source 82 and photocells 87, 89, are arranged externally of the dynamometer.

Figure 30:
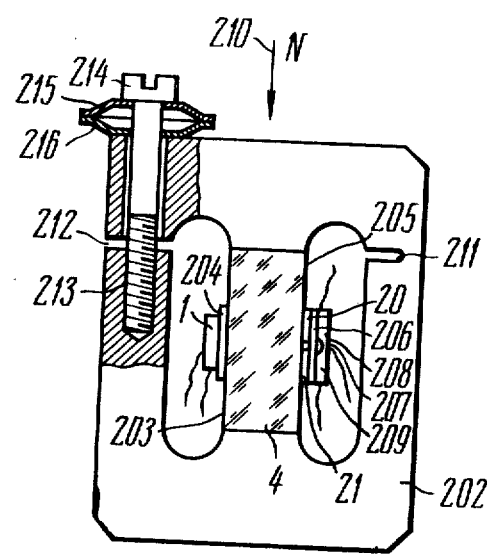
FIG. 30 is a longitudinal section view of a thermometer based on the transducer of FIG. 4.

FIG. 30 shows a thermometer in which use may be made of any one of the piezo-optic transducers of FIGS. 1 through 9.

In this particular case, employed in the thermometer is the piezo-optic transducer of FIG. 4 with the difference that both the polarizers and analyzers therein are made as integral pieces. The electric part of the thermometer is arranged as shown in FIG. 12.

The elastic element 4 (FIG. 30) of the thermometer is in the form of a rectangular parallelepiped whose end portions are bonded to a rigid housing 202. Bonded to the middle portion of a transparent face 203 of the elastic element 4 are a polarizer 204 and, on top, the light source 1, while bonded to the middle portion of a transparent face 205 of the elastic element 4 are the phase-shifting plates 20, 21 and, on top, an analyzer 206. Bonded on top of the analyzer 206 is a differential photocell 207 with photolayers 208 and 209.

The polarization planes of the polarizer 204, analyzer 206, as well as the maximum and minimum velocity axes F and S, respectively, of the phase-shifting plates 20 and 21 are oriented with respect to the force N of thermal contraction (extension) the vector whereof is indicated by arrow 210, just as in the case illustrated in FIG. 4.

A portion of the luminous flux from the light source 1 (FIG. 30) passes through the polarizer 204, elastic element 4, phase-shifting plate 20, and analyzer 206 to be incident upon the photolayer 208 of the photocell 207 similarly to the beam A (FIG. 4) passing through the polarization-optical channel 14 towards the photocell 12. The other portion of the luminous flux from the light source 1 (FIG. 30) passes through the polarizer 204, elastic element 4, phase-shifting plate 21, and analyzer 206 towards the photolayer 209 similarly to the beam B (FIG. 4) passing through the polarization-optical channel 15 towards the photocell 13.

Made in the housing 202 (FIG. 30) are a groove 211 and a slot 212. Screwed into a threaded hole 213 made in the housing 202 is a screw 214 with a spring 215 being placed between its head and the housing 202. Provision is also made for a cable (not shown) coupling the light source 1 and photocell 207 to the rest of the components of the circuit arranged in accordance with FIG. 12.

The principle of operation of piezo-optic transducers is based on the photoelasticity effect which consists in the appearance of optical anisotropy in initially isotropic media or in a variation of optical anisotropy in anisotropic media, such as crystals, under the action of mechanical stresses occuring in the medium as a result, for example, of applying, thereto external forces. In this case, the value of the appearing optical anisotropy or its variation is proportional to the mechanical stress in the medium.

In a particular case, applicable to piezo-optic transducers, optical anisotropy manifests itself by the presence in the medium of two refractive indices $n_x$ and $n_y$ in two mutually perpendicular directions $O_x$ and $O_y$ referred to as principal optical axes. In such media, a light ray is split into two polarized rays, ordinary and extraordinary, the polarization planes whereof are parallel to the principal optical axes $O_x$ and $O_y$, as well as to the direction of the ray through the medium.

An optical anisotropy variation involves a variation in the difference between the refractive indices $n_x$ and $n_y$, hence, a variation in the difference between the velocities of the wave fronts of the ordinary and extraordinary rays, which results in the appearance of variation of a difference $\Delta\alpha$ of their phases at the exit from the anisotropic medum (cf. 1) "Physical Properties of Crystals: Their Represenation by Tensors and Matrices" by J. F. Nye, M.A., Ph.D., Oxford, Clarendon Press 1957; 2) "Polarized Light: Production and Use" by William A. Shurkliff, Harward University Press, Cambridge, Massachusetts, 1962).

In the case where a medium is subjected to uniaxial contraction (extension) creating therein a uniform mechanical stress $\sigma$, the principal optical axes $O_x$ and $O_y$ of the optical anisotropy occurring therewith will be oriented so that one of them coincides with the vector of the mechanical stress $\sigma$, hence, with the vector of the force N causing this stress. The difference $\Delta\alpha$ of the phases (phase shift or angle) of the ordinary and extraordinary components of the light ray normal to the principal optical axes $O_x$ and $O_y$ can be expressed, in this case, as $$\Delta\alpha = \frac{2\pi d\sigma}{\sigma_o^{1.0}} \qquad (1)$$

wherein $d$ is the length of the ray path through the medium, $\sigma_o^{1.0}$ is a piezo-optic constant determined by the properties of the medium and the light wavelength.

A variation in the phase difference of the ordinary and extraordinary rays results in the conditions of their interference being changed, therefore, the intensity of light may be varied, in principle, by way of varying the optical anisotropy of the medium through which this light passes.

Given the above introductory remarks, consider now the operation of specific embodiments of the proposed piezo-optic transducer and piezo-optic measuring instruments based thereon.

The transducer of FIG. 1 and circuitry of FIG. 12 operate as follows.

The beam A (FIG. 1) of the light from the source 1 becomes plane-polarized after having passed through the polarizer 2, its polarization plane making an angle of 45° with the vector of the force N. In the elastic element 4 which has become optically anisotropic as a result of the force N acting thereupon, the beam A is split into two plane-polarized components whose polarization planes are mutually perpendicular, the polarization plane of one of the components being parallel to the force N. At the exit from the elastic element 4, the wave oscillations of the components of the beam A have a phase difference $\Delta\alpha$ the value whereof is determined by equation (1).

Then, the beam A passes through the optically anisotropic phase-shifting plate 8. The thickness ($d$) of the phase-shifting plate 8 has been selected such that the components of the beam A are additionally imparted what is known as the initial phase shift $\alpha_o$. Thus, the total phase shift of the components of the beam A at the exit from the phase-shifting plate 8 becomes equal to $\Delta\alpha+\alpha_o$.

The polarization planes of the components of the beam A are mutually perpendicular, therefore their interference at the exit from the phase-shifting plate 8 results in the beam A becoming, in the general case, elliptically polarized without any variation in its intensity taking place.

Further, the components of the beam A reach the analyzer 10. Passing through the analyzer 10 are only those portions of the beam A components which are equal to the projections of the beam A components onto the polarization plane of the analyzer 10. The polarization planes of those portions of the beam A components which have passed through the analyzer 10 are parallel, and the interference of those portions is accompanied by a variation in the intensity of the light beam A in accordance with the well-known equations:

$$L_{\perp} = L_m \sin^2 \frac{\Delta\alpha+\alpha_o}{2} + L_n \qquad (2)$$

and $$L_{\parallel} = L_m \cos^2 \frac{\Delta\alpha+\alpha_o}{2} + L_n \qquad (3)$$

wherein $L_{\perp}$, $L_{\parallel}$ is the intensity of the light beam A (B) at the exit from the analyzer with mutually perpendicular polarizers (equation (2)) and parallel polarizers (equation (3)), $L_n$ is the minimum intensity of the beam A (B) at the exit from the analyzer, and $L_m$ is the intensity of the beam A as it enters the analyzer, minus $L_n$.

The presence of the factor $L_n$ is due to the imperfection of the optical components of the transducer.

It should be emphasized that the intensity of the beam A varies, with interference of its components, uniformly through out the entire beam downstream of the analyzer 10. This lifts the limitations normally imposed in interference systems on the position of the photocell 12. In this case, the photocell 12 may be placed anywhere on the path of the beam A downstream of the analyzer 10, and the photosensitive layer of the photocell need not be normal to the beam A.

Equations (2) and (3) are used to determine the variation in the intensity of light at the exit from any polarization-optical channel of any piezo-optic transducer with $\Delta\alpha$ and $\alpha_o$ being substituted with respective values with respective signs.

Figure 31:
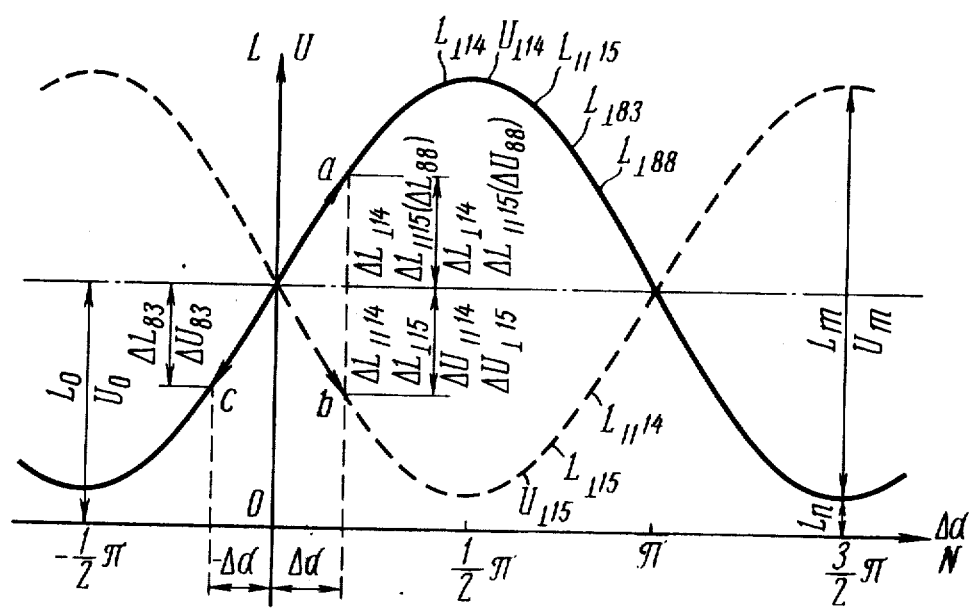
FIG. 31 shows graphically variations in the luminous fluxes through the polarization-optical channels 14, 83 and 15, 88 versus a variation in the phase shift $\Delta\alpha$.

The components 2, 4, 8 and 10 of the transducer of FIG. 1 make up the polarization-optical channel 14. The initial phase shift $\alpha_o$ created by the phase-shifting plate 8 may be equal to $\frac{1}{2}\pi+n\pi$, wherein $n = 0, 2, 4, 6$ .... In this case, the curve of the dependence of the intensity of the light beam A at the exit from the analyzer 10 on the value $\Delta\alpha$ according to (2) has the shape of a sinusoid $L_{\perp\ 14}$ and is shown in FIG. 31 as a solid line, with the value $\Delta\alpha$ being plotted along the horizontal axis and the value $L_{\perp\ 14}$ being plotted along the vertical axis. The minimum values $L_{\perp\ 14}$ are equal to $L_n$. With $N=0$, $\Delta\alpha$ is also equal to zero. In this case, the value $L_{\perp\ 14}$ is equal to $L_o$ and corresponds to point O on the graph showing $L_{\perp\ 14}$ versus $\Delta\alpha$, the curve having maximum steepness and linearity in the vicinity of this point. Therefore, O may be considered as the working point of the polarization-optical channel 14.

The phase shift $\Delta\alpha$ is proportional to the force N, as can be inferred from equation (1) written as $$\Delta\alpha = \frac{2\pi N}{b\sigma_o^{1.0}} \qquad (4)$$

wherein $b$ is the cross-section of the elastic element 4 normal to the beam A.

Therefore, the values of the force N are plotted, to a respective scale, along the horizontal axis (FIG. 31).

All that has been said in connection with the physics of the operation of the polarization-optical channel 14 (FIG. 1) applies equally to any polarizaton-optical channel of the piezo-optic transducers shown in FIGS. 1 through 11. The only difference from the polarization-optical channel 14 (FIG. 1) will reside, in each case, in the means for assigning a respective sign to the increments of the beams A and B at the exits of the polarization-optical channels. These means include: the phase-shifting plate thickness, orientation of these plates, polarizers and analyzers, and, finally, the elastic element. It is these differences that will be mentioned below in the description of the polarization-optical channels of piezo-optic transducers, while the physical aspects of their operation will be omitted for brevity.

The polarization-optical channel 15 (FIG. 1) including the polarizer 3, elastic element 4, phase-shifting plate 9, and analyzer 11 differs from the polarization-optical channel 14 only in the thickness of the phase-shifting plate 9, which has been selected such that $\Delta_o$ is equal to $3/2\pi+n\pi$. In this case, the curve of the dependence of the intensity of the beam B passing through the polarization-channel 15 on $\Delta\alpha$ at the exit from the analyzer 11, in accordance with equation (2), has the shape of a sinusoid $L_{\perp 15}$ and is shown in FIG. 31 as a broken line.

The sinusoidal curves $L_{\perp 14}$ and $L_{\perp 15}$ of the dependence of the intensities of the light beams A and B on $\Delta\alpha$ are shifted in FIG. 31 with respect to each other horizontally through half a cycle, i.e. when the force N is applied to the elastic element 4, the increments $\Delta L_{\perp 14}$ and $\Delta L_{\perp 15}$ of the beams A and B are equal in value but different in polarity.

In this case, it is the different thickness of the phase-shifting plates 8 and 9 that serves as the means for varying the intensity of the luminous flux through the additional polarization-optical channel 14, which variation is opposite in polarity to that in the intensity of the luminous flux through the main polarization-optical channel 15.

With $N = 0$, $\Delta\alpha$ is also equal to zero, $L_{\perp 14}$ and $L_{\perp 15}$ are equal to $L_o$ and correspond to the working point O on the graphs showing $L_{\perp 14}$ and $L_{\perp 15}$ versus $\Delta\alpha$.

When the force N is applied to the elastic element 4, a phase shift $\Delta\alpha$ occurs between the ordinary and extraordinary components of the beams A and B, which is determined from equation (4), and the intensities of the beams A and B at the exits of the polarization-optical channels 14 and 15 are imparted increments $\Delta L_{\perp 14}$ and $\Delta L_{\perp 15}$ and become equal, respectively, to $L_o + \Delta L_{\perp 14}$ and $L_o - \Delta L_{\perp 15}$. These values correspond to the points a and b of respective graphs represented in FIG. 31.

The working range of variation of the value $\Delta\alpha$ is selected depending on the predetermined admissible nonlinearity of the relationship $L_{\perp 14}$ ($L_{\perp 15}$). With a nonlinearity of 1%, the permissible value $\Delta\alpha$ caused by a variation $\Delta N$ in the force N is equal to 20°. In this case, the increments of the beams A and B at the exits of the polarization-optical channels 14 and 15 reach their maximum values:

$$\Delta L_{14\ max} = 0.35 L_o = 0.35 \frac{L_m}{2}$$
$$\Delta L_{15\ max} = 0.35 L_o = 0.35 \frac{L_m}{2} \quad (5)$$

while the difference between the intensities of said beams A and B is equal to $$L_o + \Delta L_{14\ max} - (L_o - \Delta L_{15\ max}) = \Delta L_{14\ max} + \Delta L_{15}$$
$$max = 2 \cdot 0.35 L_o = 0.35 L_m \quad (6)$$

Here, $L_m/2$ is taken equal to $L_o \rightarrow$, as is normally the case with a high-quality polarizer and analyzer when $L_u \rightarrow 0$.

The value 0.35 preceding $L_m$ is known as coefficient $K_l$ of limiting relative variation in the measurand which in this case is $L_m$.

It should be noted, for comparison, that this coefficient in strain-gauge (tensoresistive) transducers with wire or semiconductor strain gauges is equal to about 0.001 and 0.02, respectively.

The operation of the electric circuitry of FIG. 12 in the transducer of FIG. 1 is as follows.

With $N = 0$, hence, $\Delta\alpha = 0$, incident upon the photocells 12 and 13 (FIG. 1) arranged downstream of the analyzers 10 and 11 are the beams A and B, respectively, equal to $L_o$ (FIG. 31). In this case, photocurrents $I_{14}$ and $I_{15}$ of the photocells 12 and 13 are equal to $I_o$ and cause voltage drops $U_{\perp 14}$ and $U_{\perp 15}$ equal to $U_o$ across the resistors 94 and 95 (FIG. 12). Then the voltages across the resistors 98 and 99 connected to the transistors 96 and 97 are also equal, with the output signal across the terminals 102 being equal to zero.

It should be noted at this point that in the circuitry of FIG. 12 as well as in all those described below, the curves of the dependences of the photocell photocurrents, hence, the voltage drops across the resistors 94 and 95, on the value $\Delta\alpha$ are sinusoidal in shape and coincide in phase with the sinusoidal variations in the intensities of the light beams A and B at the exits from the polarization-optical channels. Therefore, in FIGS. 31, the values of the voltage drops as well as photocurrents are plotted along the vertical axis and to such a scale that the curves of their dependences on the value $\Delta\alpha$ coincide with those of the dependences of respective luminous fluxes on the value $\Delta\alpha$. For simplicity, shown in FIG. 31 are only the curves of the dependences of the voltage drops $U_{\perp 14}$ and $U_{\perp 15}$ across the resistors 94 and 95 on $\Delta\alpha$ for the transducer of FIG. 1 in which use is made of the circuitry of FIG. 12.

The resistors 98 and 99 are connected to the + terminal 101 via the adjustable resistor 109. The latter is intended for zero setting of the transducer output signal across the terminals 102 if as a result of discrepancy between the parameters of the components of the polarization-optical channels 14 and 15 (FIG. 1) and respective electric circuits the output signal is not equal to zero in the absence of the force N.

After the force N causing a phase shift $\Delta\alpha$ has been applied to the elastic element 4, the intensities of the light beams A and B, now equal to $L_o + \Delta L_{\perp 14}$ and $L_o - \Delta L_{\perp 15}$, correspond to the points a and b (FIG. 31) on the curves of the dependences of $L_{\perp 14}$ and $L_{\perp 15}$ on $\Delta\alpha$. In this case, the photocurrents of the photocells 12 and 13 (FIG. 12) acquire increments $\Delta I_{14}$ and $-\Delta I_{15}$ and become equal to $I_o + \Delta I_{14}$ and $I_o - \Delta I_{15}$, respectively.

The voltage drops caused by the photocurrents across the resistors 94 and 95 acquire increments $\Delta U_{14}$ and $-\Delta U_{15}$ and become equal to $U_o + \Delta U_{14}$ and $U_o - \Delta U_{15}$, the difference therebetween being equal to $$U_o + \Delta U_{14} - (U_o - \Delta U_{15}) = \Delta U_{14} + \Delta U_{15} \quad (7)$$

The voltage difference across the resistors 98 and 99 connected to the transistors 96 and 97, hence, across the terminals 102, should in this case be equal to $2K(\Delta U_{14} + \Delta U_{15})$, wherein K is the transmission factor of the transistors 96 and 97, which is close to unity.

This voltage difference across the terminals 102 is proportional to the force N and is the transducer output signal.

If it is taken into consideration that the increments $\Delta U_{14}$ and $\Delta U_{15}$ of the voltage drops across the resistors 94 and 95 are proportional to the increments $\Delta I_{14}$ and $\Delta I_{15}$ of the photocurrents as well as to the increments $\Delta L_{14}$ and $\Delta L_{15}$ of the intensities of the light beams A and B at the exits from the polarization-optical channels 14 and 15, equation (6) can take the following form:

$$U_o + \Delta U_{14\ max} - (U_o - \Delta U_{15\ max}) = \Delta U_{14\ max} + \Delta U_{15}$$
$$max = 2 \cdot 0.35 U_o = 0.35 U_m \quad (8)$$

wherein $U_m$ is the maximum possible difference in voltage drops across the resistors 94 and 95 (FIG. 12) (see also FIG. 31).

The value $U_m$ is close to the value of the transducer supply voltage $U_p$. When used as the photocells 12 and 13 (FIG. 1) are silicon photodiodes, the values $U_m$ and $U_p$ may be equal to, for example, 24 V. Then, in accordance with equation (8), the difference in voltage drops across the resistors 94 and 95 (FIG. 12) may be as high as ±4.5 V or, in the case of measurement of a unique force, 9 V.

The proposed transducer may also be compared to straingauge transducers with respect to another very important parameter which is the coefficient of tensosensitivity (S) and which is determined, for strain gauges, from the following well-known equation:

$$S = \frac{4}{n} \cdot \frac{\Delta U / U_p}{\epsilon}.$$

wherein $n$ is the number of active bridge arms,
$U_p$ is the bridge supply voltage
$\epsilon$ is the unit strain of the elastic element whereto the strain gauge is bonded, and
$\Delta U$ is the voltage increment across the strain gauge in measurements.

Here, the ratio $\Delta U/U_p$ is similar to $\Delta U_{1\ 14}/U_o$ in the case of a piezo-optic transducer for which the following equation can be written:

$$S = \frac{4}{n} \cdot \frac{\Delta U_{1\ 14}/2U_o}{\epsilon} \qquad (9)$$

According to equation (7), one can find the limiting value of this relationship: $\Delta U_{1\ 14}/U_o = 0.35$. A respective limiting unit strain $\epsilon$ can be derived from the known equation $\epsilon = \sigma/E$, wherein E is the elastic modulus of the material of the elastic element 4 (FIG. 1) equal, e.g. for glass, to $7 \cdot 10^5$ kg/cm². The value $\sigma$ can be found from the following equation:

$$\sigma = \frac{\Delta \sigma_o^{1.0}}{360°} \qquad (10)$$

by substituting $\Delta \alpha = 20°$ and $\sigma_o^{1.0} = 240$ kg/cm² (for glass). Then, $\sigma = 13$ kg/cm², $\epsilon = 2 \cdot 10^{-5}$, and $S = 35 \cdot 10^3$ (with $n = 1$ in equation (9)).

When used as the material for the elastic element are certain single crystals having substantially lower $\sigma_o^{1.0}$ (in the order of 45 kg/cm²) and higher E (in the order of $1.5 \cdot 10^6$ kg/cm²), the coefficient of tensosensitivity S can be made equal to $2 \cdot 10^5$.

Thus, with respect to the magnitude of the coefficient of tensosensitivity S, piezo-optic transducers are far superior to both strain-gauge transducers in which S equals 2 and $10^2$ for wire and semiconductor strain gauges, respectively, and all prior art parametric transducers known to the authors.

The high tensosensitivity of piezo-optic transducers enables the use therein of highly ridig elastic elements, which is of particular importance in the development of high-frequency measuring instruments.

The optical part of a transducer, comprising a glass parallelepiped having bonded to the faces thereof mica plates serving as the phase-shifting plates and film polaroids serving as the polarizers and analyzers, is a compact, monolytic and rigid assembly immune to vibration and impact loads.

The optical part of a transducer is relatively easy in manufacture and requires no adjustments which are a must in assembling optical devices. This is due to the fact that interaction of light with the optical components of a piezo-optic transducer is in accordance with the laws of so-called physical optics, and, under certain conditions typical for the operation of the transducer, the requirements as to the geometrical parameters of the components, such as regularity of their faces and thickness, mutual arrangement of the components and orientation of their optical axes are substantially moderated.

The parallel misalignment of the optical components and angular deviations of their optical axes which may be as high as 2° to 3° practically do not affect the sensitivity and linearity of the transducer.

Figure 16:
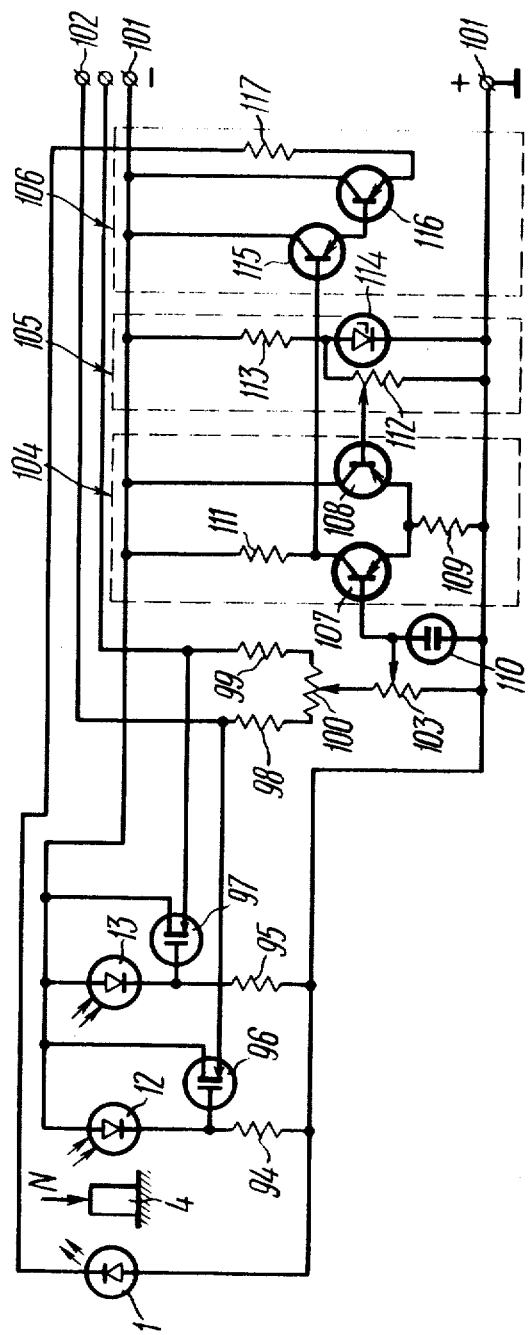
FIG. 16 is an electric circuit diagram of the transducer of FIG. 15.

To minimize the sensitivity factor drift in the piezo-optic transducer of FIG. 1 provision has been made for a special sensitivity factor stabilizing circuit shown in FIGS. 15 and 16.

The principle of operation of this circuit is based on the property of transducers with a differential arrangement of their converting elements to maintain constancy of the sum of signals at the differential elements of the circuit with a variable measured. This is due to the fact that the increments of signals at the differential elements, particularly in a piezo-optic measuring transducer, namely the increments of the light beams A and B as they enter the photocells 12 and 13 (FIG.16), photocurrents at the outputs of these photocells, and so on to the increments of the voltages across the resistors 98 and 99, are equal in value but opposite in polarity.

As a result, the voltage drop caused by the output currents of the transistors 96 and 97 across the resistor performing the function of the adder 103 remains unchanged despite a variation in the force N applied to the elastic element 4.

However, if for some reason, for example, due to temperature fluctuations, the luminous emittance of the light source 1 (which is a semiconductor photodiode) varies (e.g. decreases), this will result, firstly, in a lower sensitivity of the transducer and, secondly, in a lower voltage drop across the resistor performing the function of the adder 103, because the variations in the signals at all differential elements of the transducer, including the resistors 98 and 99, will be of the same polarity (decreasing).

A decrease in the voltage across the resistor performing the function of the adder 103 may be achieved by a negative feedback to the input of the light source 1 in order to enhance its luminous emittance and to bring, thereby, the voltage drop across this resistor as well as the sensitivity of the transducer back to the initial level.

The first element of the feedback circuit is the base of the transistor 107 applied whereto is the voltage from the cursor of the resistor performing the function of the adder 103. The transistor 107 performs the function of the comparison unit 104 comparing the signal applied from the resistor of the adder 103 with the reference signal applied to the emitter of the transistor 107 from the Zener diode 114 via an emitter follower the function whereof is performed by the transistor 108. The difference between these two signals is considered to be an error signal. The reference signal is regulated by means of the adjustable resistor 112. The resistor 113 serves to limit the current through the Zener diode 114 which, together with the resistor 112, is the source 105 of the reference signal.

The error signal is applied from the resistor 111 to the base of the transistor 115, then, from its emitter to the base of the transistor 116 whose emitter is connected via the resistor 117 to the light source 1.

The transistors 115 and 116 perform the function of the controlled power supply 106 which, depending on the sign of the error signal, varies the power supplied to the light source 1 so as to equalize the error signal to zero, as has been mentioned above, bringing thereby the luminous emittance of the light source 1 and sensitivity of the transducer back to the initial level.

To minimize the output signal zero drift in the transducer of FIG. 1, due to the temperature instability of parameters of the optical and electrical components, use is made of a temperature zero drift compensation circuit arranged as shown in FIGS. 17 and 18.

This circuit includes the adjustable resistor 119 inserted between the resistor 117 and light source 1. A temperature variation, hence, a variation in the supply current to the light source 1 (semiconductor photodiode), is followed by a variation in the voltage across the adjustable resistor 119 as a result of operation of the sensitivity factor stabilizing circuit. A variation in the supply current to the light source 1 results in an increment of the voltage drop across the resistor 119. This increment can be applied to the transducer output terminals 102 via the adjustable resistor 120 and resistors 121, 122 to compensate for the temperature output signal zero drift. In this case, the cursor of the adjustable resistor 119 is positioned so that the voltage between the cursor and one of the terminals 102 is equal to zero when the transducer temperature is normal, the force N is equal to zero, and the voltage between the terminals 102 is zero, too. The cursor of the resistor 120, associated with the cursor of the resistor 119, is positioned so that when the transducer temperature changes, the voltage increment across the resistor 119, distributed by the resistors 120, 121 and 122 between the terminals 102 could compensate for the tranducer temperature zero drift.

The sensitivity factor stabilizing circuit (FIGS. 15 and 16) and temperature zero drift compensation circuit (FIGS. 17 and 18) are highly efficient and enable the sensitivity and output signal zero stabilities to be increased more than 20 times.

The only difference in operation of the piezo-optic measuring transducer of FIG. 2 and that shown in FIG. 1 is that due to the polarization planes of the polarizers 16, 17 and analyzers 18, 19 being parallel therein, the curves $L_{\parallel\ 14}$ and $L_{\parallel\ 15}$ (FIG. 31) of the dependences of the light beams A and B on $\Delta\alpha$ at the exits from the polarization-optical channels 14 and 15 (FIG.2) are determined from equation (3). As can be inferred from FIG. 31, the curves $L_{\parallel\ 14}$ and $L_{\parallel\ 15}$ coincide with the curves $L_{\perp\ 15}$ and $L_{\perp\ 14}$, respectively.

In the tranducer of FIG. 2, use is made of the circuitry of FIG. 12. However, here as well as in the following description of operation of other transducers, the dependences of the voltage drops across the resistors 94 and 95 on the value $\Delta\alpha$ are not given since, as has been mentioned above, they are similar to the dependences of the beams A and B on $\Delta\alpha$.

The operation of the piezo-optic transducer of FIG. 3 differs from that of the tranducer of FIG. 1 only in that due to the phase-shifting plates 20 and 21 (FIG. 3) having the same thickness and the axes of maximum and minimum velocities F and S, respectively, of the phase-shifting plate 20 being normal to those of the phase-shifting plate 21, the initial shift $\alpha_o$ of the phases of the components of the beam A, created by the phase-shifting plate 20 is opposite in polarity to the initial shift of the phases of respective components of the beam B. The relationships between the intensities of the light beams A and B and the value $\Delta\alpha$ at the exits from the polarization-optical channels 14 and 15, determined in this case from equation (2), coincide with $L_{\perp\ 14}$ and $L_{\perp\ 15}$ in FIG.31. Thus, a variation in the intensity of the luminous flux through the additional channel 15, which is opposite in polarity to that in the luminous flux through the channel 14, is attained by means of the orientation of the axes of maximum and minimum velocities F and S, respectively, of the phase-shifting plates 20 and 21. As a result, the initial phase shifts $\alpha_o$ in the channels 14 and 15 are equal in value and opposite in polarity.

The only difference in operation of the piezo-optic tranducer shown in FIG. 4 and that shown in FIG. 3 is that due to the polarization planes of the polarizers 22, 23 (FIG. 4) and analyzers 24, 25 being parallel, the curves of the dependences of the light beams A and B on $\Delta\alpha$, determined in this case from equation (2), coincide with the curves $L_{\perp\ 14}$ and $L_{\perp\ 15}$ (FIG. 31).

The piezo-optic transducer of FIG. 5 operates in a similar manner as that shown in FIG. 4 since the presence of two light sources 31 and 32 (FIG. 5) emitting the beams A and B, respectively, do not introduce any changes into the operation of the polarization-optical channels 14 and 15.

In the transducer of FIG. 5, use is made of the circuitry shown in FIG. 13 differing from that shown in FIG. 12 only in the presence therein of two series-connected light sources 31 and 32.

The piezo-optic transducer of FIG. 6 operates as follows. The polarization-optical channel 14 (FIG. 6) operates in the same fashion as the channel 14 of FIG. 4, while the polarization-optical channel 15 (FIG. 6) operates similarly as the channel 14 of FIG. 3.

Used as the means for varying the intensity of the luminous flux in the additional polarization-optical channel 15, which variation is opposite in polarity to that in the luminous flux through the main polarization-optical channel 14 is the arrangement wherein the polarization planes of the polarizer 34 and analyzer 38 are parallel, while those of the polarizer 35 and analyzer 39 are perpendicular.

The piezo-optic transducer of FIG. 7 operates in the following manner. The polarization-optical channel 14 (FIG.7) operates just like the channel 14 of FIG 13, and the polarization-optical channel 15 (FIG. 7) operates similarly to the channel 14 of FIG. 4. Use being made of two separate light sources 42 and 43 (FIG. 7) in the polarization-optical channels 14 and 15 does not introduce any changes into the operation of these channels as compared to respective channels 14 of FIGS. 3 and 4.

The piezo-optic transducer of FIG. 8 operates similarly as that of FIG. 7.

The transducer of FIG. 9 operates as follows. The polarization-optical channels 54 and 55 (FIG. 9) operate similarly as the channel 14 of FIG. 4, while the polarization-optical channels 56 and 57 (FIG. 9) operate similarly as the channel 14 of FIG. 3. In this respect, operation of the transducer of FIG. 9 is similar to that of the transducer of FIG. 6. In the transducer of FIG. 9, the means for varying the intensity of the luminous fluxes through the polarization-optical channels 56 and 57, which variation is opposite in polarity to that in the luminous fluxes through the polarization-optical channels 54 and 55, is similar to the means for attaining same in the transducer of FIG. 6.

The piezo-optic transducer of FIG. 9 makes use of the circuitry of FIG. 14 in which the light sources 58, 59, 60 and 61 are placed in series, the photocell 74 is placed in parallel with the photocell 75, and the photocell 76 is placed in parallel with the photocell 77.

The operation of the piezo-optic transducer of FIG. 10 differs from that of all the above-described transducers (FIGS. 1 to 9) in that its elastic element 78 (FIG. 10) made in the form of a cantilever beam is subject to bending strain. The strain in the elastic element 78 has opposite signs on either side of the neutral plane 90, therefore, the sign of the phase shift $\Delta\alpha$ between the ordinary and extraordinary components of the light beam A is opposite to that of the phase shift $\Delta\alpha$ between respective components of the beam B. The variation in the intensities of the light beams A and B as a function of $\Delta\alpha$, at the exits from the polarization-optical channels 83 and 88, which is in the form of the curves $L_{\perp\ 83}$ and $L_{\perp\ 88}$ (FIG. 31), is determined from equation (2) substituted wherein to are the values $\Delta\alpha$ of opposite polarities. Since the values $\alpha_o$ produced in both polarization-optical channels 83 and 88 (FIG. 10) by the common phase-shifting plate 85 are equal in magnitude and polarity, the curves $L_{\perp\ 83}$ and $L_{\perp\ 88}$ (FIG. 31) coincide.

In addition, the values $L_{\perp\ 83}$ and $L_{\perp\ 88}$ vary obeying the same law, equation (2), as the value $L_{\perp\ 14}$ corresponding to the intensity of the light beam A in the transducer of FIG. 3, therefore, the curves $L_{\perp\ 83}$, $L_{\perp\ 88}$ and $L_{\perp\ 14}$ (FIG. 31) coincide.

When the force N is applied to the elastic element 78 (FIG.10), appearing in one half thereof, on one side of the neutral plane 90, is extension strain, while compression strain appears in the other half, on the other side of the neutral plane 90. It is precisely because of this that the phase shifts $\Delta\alpha$ between the components of the beams A and B have opposite signs. For the same reason, the increments $\Delta L_{83}$ and $\Delta L_{88}$ (FIG. 31) of the intensities $L_{\perp\ 83}$ and $L_{\perp\ 88}$ of the light beams A and B have opposite signs, too.

The value of the intensity $L_{\perp\ 88}$ after the increment $\Delta L_{88}$ will correspond to the point a on the curve $L_{\perp\ 88}$ (or on the curve $L_{\perp\ 83}$ if it is borne in mind that the curves $L_{\perp\ 88}$ and $L_{\perp\ 83}$ coincide), while the value of the intensity $L_{\perp\ 83}$ after the increment $\Delta L_{83}$ will correspond to the point c on the curve $L_{\perp\ 83}$ ($L_{\perp\ 88}$). Thus, in the transducer of FIG. 10, the function of the means for varying the intensity of the luminous flux in the polarization-optical channel 88, which variation is opposite in polarity to that in the intensity of the luminous flux in the polarization-optical channel 83, is performed by the elastic element 78 occurring wherein are strains having opposite signs.

Used in the piezo-optic transducer of FIG. 10 is the circuitry of FIG. 12, the operation whereof has been described above.

The piezo-optic transducer of FIG. 11 operates similarly to that of FIG. 10, the presence in each one of the polarization-optical channels 83 and 88 (FIG. 11) thereof of separated light sources 91 and 92 introducing no changes into the operation of these channels.

The transducer of FIG. 11 uses the circuitry of FIG. 13 whose operation has also been described above.

On the basis of the above-described piezo-optic measuring transducers shown in FIGS. 1 through 11 and electric circuits used therein, shown in FIGS. 12 through 18, there have been provided various measuring devices, namely, accelerometers, pressure gauges, dynamometers and thermometers.

Shown in FIGS. 19 and 20 is an accelerometer in which use is made of the piezo-optic transducer of FIG. 5 and circuitry of FIG. 13. In addition, in this accelerometer as well as in any one of the measuring devices illustrated in FIGS. 21 through 29 there may be used, if necessary, the sensitivity factor stabilizing circuit of FIGS. 15 and 16 and temperature zero drift compensation circuit of FIGS. 17 and 18. The operation of piezo-optic transducer of FIG. 5 and circuits of FIGS. 13 and 15 through 18 has been described above.

As the accelerometer moves with acceleration, its elastic element 26 (FIG. 19) is acted upon, in a direction from the mass 124, by force $N = am$, wherein $a$ is a component of the linear acceleration vector, equal to its projection on the axis 125 of symmetry, and $m$ is the mass, physically speaking, of the mass 124. The piezo-optic transducer together with the electric circuit, used in this accelerometer, convert the force N into an electrical signal which can be recorded or processed in any other convenient manner.

The diaphragms 126 and 127 reduce the number of degrees of freedom of the mass 124 to one (in the direction of the axis 125 of symmetry) preventing thereby the elastic element 26 from being deformed by bending forces originating from the mass. This minimizes the possibility of the accelerometer's becoming sensitive to the acceleration components normal to the axis 125 of symmetry. It should also be pointed out here that the piezo-optic transducers in accordance with FIGS. 1 through 8 are insensitive, in principle, to bending strains as, in the case of a bending force occurring in a plane normal to the vector of the force N, the integral over the stress line along the light beams A and B is equal to zero, therefore, the total phase shift accumulated by the components of the beams A and B in the elastic element as a result of bending strains is also equal to zero.

The rigidity of the diaphragms 126 and 127 (FIG. 19) in the direction of the force N is negligibly small with respect to that of the elastic element 26 in the same direction, which is why the diaphragms do not impair the sensitivity of the accelerometer.

In the piezo-optic accelerometer of FIGS. 21 and 22, the elastic element 78 is subject to bending strains, therefore, used therein in the transducer of FIG. 10 together with the electric circuit of FIG. 12.

The accelerometer of FIGS. 21 and 22 measures the linear acceleration vector component equal to the projection of this vector on the direction indicated by arrow 152 which is normal to the neutral plane 90 of the elastic element 78. The piezo-optic transducer of FIG. 10 and circuitry of FIG. 12, whose operation has been described above, convert the inertial force N parallel to the arrow 152 into an electrical signal.

The accelerometer is insensitive to the linear acceleration vector components normal to the arrow 152 as well as to those two linear acceleration vector components whose axes coindice with the force N or are perpendicular to the light beams A and B, since in the piezo-optic transducer of FIG. 10 any force normal to the force N and any moment that does not coincide with the moment of the force N will produce the same phase shift Δα between the ordinary and extraordinary components. This is due to the fact that the integral over the line of stress from said forces and moments in the elastic element 78 (FIG. 10), along the beams A and B, is close to zero.

Shown in FIG. 23 is a pressure gauge whose elastic element 4 is subject to compression and extension. In this pressure gauge, use is made of the piezo-optic transducer of FIG. 4 and circuitry of FIG. 12; the operation of both has been described above.

When a pressure P is applied into the space confined between the diaphragm 154 (FIG. 23) and cover 161, force $N = PS$, wherein S is the effective diaphragm surface area, starts acting upon the elastic element 4. The piezo-optic transducer and electric circuit used in this pressure gauge convert the force N into an electrical signal.

That part of the pressure gauge diaphragm 154 which is confined between its thicker central portion and the housing 160 against which its edge is pressed is made as part of a toroidal surface (it has an annular groove made between the thicker central part and housing 160). Such a shape of the diaphragm reduces to a minimum what is known as the coefficient of volume displacement ($K_r$) which is equal to the ratio between the increment of the volume of the space confined between the cover 161 and diaphragm 154 and the increment of pressure.

By varying the sizes of the diaphragm 154 and elastic element 4 it is possible to provide pressure gauges with a substantially low coefficient of volume displacement ($K_r$) and a high natural frequency of the mechanical system diaphragm-elastic element which may be as high as several tens of kHz. The bottom frequency level in the proposed piezo-optic transducer is, as has been mentioned above, practically zero. The above features of the pressure gauge based on the transducer in accordance with the invention render it most advantageous in measurements under critical conditions, e.g. in dynamic measurements, when the mass (e.g. of a fluid) applied to the diaphragm is substantially great. This may be the case with a pressure gauge being coupled to the object of measurement through a long rigid and thin tube (catheter). Such conditions often prevail in industrial as well as medical applications.

In the pressure gauge shown in FIGS. 24 and 25, the elastic element 78 whereof is subject to bending strains, use is made of the piezo-optic transducer of FIG. 10 and circuitry of FIG. 12 whose operation has been described above.

A pressure P applied into the cavity 173 of the pressure gauge through one of the unions 174 and 175 gives rise to a force N which is transmitted from the rigid central portion of the disc 168 of the diaphragm 169 to the arm 165 by means of the rod 167, which force is normal to the neutral plane 90 of the elastic element 78. The piezo-optic transducer together with the electric circuit used in the pressure gauge convert the force N into an electrical signal.

Due to the rigidity of the elastic element being reduced in the direction of the force N, this pressure gauge is rendered far more sensitive than those in which the elastic element is subject to compression and extension.

FIGS. 26 and 27 show a dynamometer in which the elastic element 26 is subject to compression. In this case, use is made of the piezo-optic transducer of FIG. 8 and circuitry of FIG. 13 whose operation has been described above.

The direction of the force N in FIG. 26 corresponds to that of the force N in FIG. 8.

The piezo-optic transducer and the electric circuit of this dynamometer convert the force N into an electrical signal.

The basic advantage of this dynamometer is the insignificant displacement of the point of application of force with a high output signal. This is due to a substantially high coefficient of tensosensitivity of the proposed piezo-optic transducer, as has been mentioned above.

In the dynamometer of FIGS. 28 and 29, the elastic element is subject to bending strains. Used in this case is the piezo-optic transducer of FIG. 10 and circuitry of FIG. 12 whose operation has been described above.

The orientation of the force N (FIG. 28) relative to the axes of the dynamometer components corresponds to that of the force N in FIG. 10 relative to the axes of the components of the transducer shown in the same figure.

The piezo-optic transducer and electric circuit used in the dynamometer of FIGS. 28 and 29 are shown in FIGS. 6 and 12, respectively.

The sensitivity of this dynamometer is substantially enhanced owing to its elastic element being subject to bending strains and through the use of the arm 195.

Shown in FIG. 30 is a thermometer making use of the piezo-optic transducer of FIG. 4 and circuitry of FIG. 12 whose operation has been described above.

The operation of the thermometer is based on the elastic element 4 (FIG. 30) being acted upon by a force N resulting from the difference in the thermal expansion coefficients of the materials of the elastic element 4 and housing 202. The direction of the force N applied to the elastic element 4 is indicated by arrow 210. The piezo-optic transducer and electric circuit used in the thermometer convert the force N into an electrical signal.

The screw 214 is intended for zero adjustment of the output signal. By selecting the disc springs 215 and 216 the required sensitivity can be attained; the higher the regidity of the springs, the higher the sensitivity of the thermometer, and vice versa. In the limit, the disc springs 215 and 216 can be removed altogether with the result that the sensitivity reaches its maximum and may be as high as about a millivolt per 0.001°C.

Thermometers of various sensitivity can be obtained by selecting the materials for the elastic element and housing with different thermal expansion coefficients.

The piezo-optic transducer in accordance with the present invention is primarily advantageous over the prior art in that it has a substantially high tensosensitivity, i.e. the ratio between a variation in the measurand and the unit strain in the elastic element. In the case of a piezo-optic transducer, that is the ratio between the unit variation in the polarization-optical channel output and unit elongation of the elastic element.

If as has been shown above, ordinary silicate glass is used as the material for the elastic element and the dimensions of the latter are selected equal to $10 \times 10 \times 10$ mm, the strain therein, corresponding to the transducer measurement range, will not exceed 12 to 14 kg/cm².

In this case, an increment of the voltage across the resistor of the photocell of a single polarization-optical channel, which can serve as the output signal, reaches the value of 4.5 V, while the output signal produced by the photocells of two differential polarization-optical channels of the transducer is equal to 9 V. An increment of length of the elastic element, corresponding to said increment of the output signal, is equal to 0.2 microns, and the ratio of the output signal to the elastic element elongation is about 1 V/0.025 mu.

When single crystals are used as the material for the elastic element, the ratio of the output signal increment to the elastic element elongation under the same conditions is equal to 1 V/0.0025 mu. If the level of noise of the transducer and its electric circuit is assumed equal, within a certain frequency range, to 1 mV, the elongation of the elastic element corresponding to this threshold signal is equal to $2.5 \cdot 10^{-6}$ mu or $0.25 \cdot 10^{-9}$ cm.

It should be emphasized that these values are not limit ones and can be increased further by introducing elastic elements of more elaborate designs.

Such characteristic features of the proposed piezo-optic transducer as its high sensitivity combined with high rigidity make it a highly promising measuring device in a number of complex applications.

A dynamometer based on this transducer is used successfully for measuring low forces within a broad frequency range with high masses being applied to the elastic element. Such conditions unfavourable for measurement arise, for example, in measuring insignificant impulsive reactive forces and moments, in the order of grams and gram-centimeters, occurring in massive, weighing up to tens and hundreds of kilograms, units with micromotors and other similar mechanisms working therein.

The high mechanical rigidity of the proposed piezo-optic transducer permits providing an accelerometer on its basis, which approximates, with respect to the top limit of the measured frequencies (10 to 15 kHz), a piezoelectric accelerometer with the difference that the passband for the lower frequencies in a piezo-optic accelerometer starts with zero Hz. This feature substantially broadens the field of its application and, which is particularly important, permits static calibration thereof by, for example, using weights, while in the case of a piezo-electric accelerometer a vibration table in required.

A pressure gauge on the basis of the proposed transducer is advantageous for measuring impulsive pressures in the cases where the pressure gauge is connected to the object of measurement through a long rigid tube filled with a fluid. In this case, as is well known, the mass m applied to the elastic element is determined from the following equation:

$$m = \left(\frac{F_m}{F_k}\right)^2 \cdot m_k,$$

wherein $F_m$ and $F_k$ are the pressure gauge diaphragm area and the tube sectional area, respectively, and $m_k$ is the mass of the fluid inside the tube. With higher ratio $F_m/F_k$ and longer tube, the applied mass may grow significantly, which results in a sharp decrease in the natural frequency, hence, in a narrower working range of frequencies of the system pressure gauge-tube. This may be the case, for example, in measuring arterial or intracardiac blood pressure with use being made of catheters 1 m long and 1 mm² in cross section. The high rigidity of the proposed piezo-optic transducer makes it possible to provide a pressure gauge on its basis having, under the above conditions, an operating frequency band of 0 to 100 Hz and even higher, which is quite adequate for medical research and practice.

In the cases where the mass applied to the elastic element is insignificant, for example, in measuring pressure directly in a fluid or gaseous medium, the operating frequency band of the piezo-optic pressure gauge may be extended from 0 to 10–20 kHz.

As has been mentioned above, the strain in the elastic element of a piezo-optic transducer, corresponding to the measurement range, does not exceed 12 to 14 kg/cm² and with the use of special materials (single crystals) is as low as 2 to 3 kg/cm². This strain level is, on average, by two orders of magnitude lower than the strength of the elastic element material, therefore, piezo-optic measuring devices in general are stable under loads which may be higher, also by two orders of magnitude, than the measurement range of the device.

Depending on the requirements imposed in each particular case on the frequency and amplitude ranges of a piezo-optic device, by modifying the design, as has been mentioned above, or by selecting an appropriate material for its elastic element, the measurement ranges of accelerometers may be varied from fractions of G (free-fall acceleration), within a working frequency band of 0 to 100 Hz, to 1,000–2,000 G, within a working frequency band of 0 to 10 kHz. The measurement ranges of pressure gauges may vary from 0.01–0.03 kg/cm², within a working frequency band of 0 to 50 Hz, to 30–50 kg/cm², within a working frequency band of 0 to 20 kHz. By using piezo-optic transducers of various designs, it is possible to provide dynamometers with measurement ranges varying from several tens of grams to several tons. The rigidity of the latter may be in the order of $1 \cdot 10^{-6}$ kg/cm.

The high sensitivity of the proposed piezo-optic measuring devices enables the amplifying means used therewith to be substantially simplified. In some cases, amplification is not even required at all or only current amplification is called for.

What is claimed is:

1. A piezo-optic measuring transducer comprising: at least one light source; a first polarization-optical channel having a first optical axis, with a first portion of a luminous flux produced by said light source passing therethrough; a second polarization-optical channel having a second optical axis, with a second portion of the luminous flux produced by said light source passing therethrough; a first polarizer of said first polarization-optical channel, arranged therein so that said first portion of said luminous flux is incident thereupon; a second polarizer of said second polarization-optical channel, arranged therein so that said second portion of said luminous flux is incident thereupon; an elastic element sensitive to a stress variation therein caused by a variation in the measurand, said elastic element forming part of both first and second polarization-optical channels and being arranged therein downstream of said first and second polarizers with respect to said luminous flux; a first analyzer of said first polarization-optical channel, arranged therein downstream of said elastic element with respect to said first portion of said luminous flux; a second analyzer of said second polarization-optical channel, arranged therein downstream of said elastic element with respect to said second portion of said luminous flux; a means of varying the intensity of said second portion of said luminous flux in said second polarization-optical channel, said intensity variation being opposite in polarity to that in said first portion of said luminous flux in said first polarization-optical channel, said luminous flux passing through said means; a first photocell of said first polarization-optical channel, arranged therein downstream of said first analyzer with respect to said first portion of said luminous flux and converting the light incident thereupon into an electrical signal; a second photocell of said second polarization-optical channel, arranged therein in a differential relationship with said first photocell downstream of said second analyzer with respect to said second portion of said luminous flux, and converting the light incident thereupon into an electrical signal; the difference in said electrical signals at the outputs of said first and second photocell being representative of the measurand.

2. A piezo-optic measuring transducer as claimed in claim 1, comprising: a first phase-shifting plate of said means for varying the intensity of said second portion of said luminous flux in said second polarization-optical channel, said intensity variation being opposite in polarity to that in said first portion of said luminous flux in said first polarization-optical channel, said first phase-shifting plate being arranged between said first polarizer and first analyzer; a second phase-shifting plate of said means, arranged between said second polarizer and second analyzer; said first and second phase-shifting plates having phase angles differing by an angle $n\pi$, wherein $n$ is an odd integer, and $\pi = 3.14 \ldots$; said first and second polarizers as well as said first and second analyzers being arranged so that their polarization planes are mutually perpendicular or parallel.

3. A piezo-optic measuring transducer as claimed in claim 2, wherein said first and second phase-shifting plates are different in thickness.

4. A piezo-optic measuring transducer as claimed in claim 2, wherein said first and second phase-shifting plates are arranged so that the axis of maximum light propagation velocity in the first phase-shifting plate makes an angle of +45° with the polarization plane of said first polarizer, while the axis of maximum light propagation velocity in the second phase-shifting plate makes an angle of −45° with the polarization plane of said second polarizer.

5. A piezo-optic measuring transducer as claimed in claim 1, comprising: a first phase-shifting plate arranged in said first polarization-optical channel; a second phase-shifting plate arranged in said second polarization-optical channel and oriented similarly as said first phase-shifting plate; said first and second phase-shifting plates having the same phase angles.

6. A piezo-optic measuring transducer as claimed in claim 5, wherein one of said polarizers and one of said analyzers of one of said polarization-optical channels are arranged so that if their polarization planes are mutually perpendicular, those of said other polarizer and analyzer are parallel, and if their polarization planes are parallel, those of said other polarizer and analyzer are mutually perpendicular, the function of said means for varying the intensity of said second portion of said luminous flux in said second polarization-optical channel, said intensity variation being opposite in polarity to that in said first portion of said luminous flux in said first polarization-optical channel, being performed by said first and second polarizers as well as said first and second analyzers.

7. A piezo-optic measuring transducer as claimed in claim 5, wherein said elastic element is made in the form of a beam having two transparent parallel faces and a neutral plane; said first and second optical axes of said first and second polarization-optical channels being almost normal to said faces and located on either side of said neutral plane of said beam at almost equal distances therefrom; said elastic element serving as said means for varying the intensity of said second portion of said luminous flux in said second polarization-optical channel, said intensity variation being opposite in polarity to that in said first portion of said luminous flux in said first polarization-optical channel.

8. A piezo-optic measuring transducer as claimed in claim 1, wherein said elastic element is made in the form of a right-angled polygonal prism with at least two transparent parallel faces almost normal to said first and second optical axes of said first and second polarization-optical channels.

9. A piezo-optic measuring transducer as claimed in claim 1, comprising: at least one more pair of polarization-optical channels; all of the polarization-optical channels being divided into a first and a second groups; said photocells of said first group being arranged in a differential relationship with those of said second group.

10. A piezo-optic measuring transducer as claimed in claim 1, wherein said first and second polarizers are made as a single piece.

11. A piezo-optic measuring transducer as claimed in claim 10, wherein said first and second analyzers are made as a single piece.

12. A piezo-optic measuring transducer as claimed in claim 11, wherein said first and second phase-shifting plates are made as a single piece.

13. A piezo-optic measuring transducer as claimed in claim 1, comprising: an adder having a first and a second inputs and an output with said first and second photocells being connected to said first and second inputs, respectively; a comparator having a first and a second inputs and an output, said first input being connected to said output of said adder; a source of reference voltage connected to said second input of said comparator; and a controlled power supply having an input and an output, said input being connected to said output of said comparator and said output being electrically associated with said light source.

14. A piezo-optic measuring transducer as claimed in claim 13, comprising: a source of a compensating signal having an input and a first, a second and a third outputs, said input being connected to said output of said controlled power supply, said first output being connected to said light source, and said second and third outputs being connected to said first and second inputs, respectively, of said adder.

15. An accelerometer comprising: a housing; an elastic element accommodated in said housing and sensitive to a stress variation therein caused by a variation in the measurand, i.e. in linear acceleration; a mass also accommodated in said housing, which is coupled with said elastic element and causing a stress variation therein following a variation in said measurand; a piezo-optic measuring transducer accommodated in said housing, which measures said stress variation in said elastic element; at least one light source in said piezo-optic measuring transducer; a first polarization-optical channel of said transducer, having a first optical axis, with a first portion of a luminous flux produced by said light source passing therethrough; a second polarization-optical channel of said transducer, having a second optical axis, with a second portion of the luminous flux produced by said light source passing therethrough; a first polarizer of said first polarization-optical channel, arranged therein so that said first portion of said luminous flux is incident thereupon; a second polarizer of said second polarization-optical channel, arranged therein so that said second portion of said luminous flux is incident thereupon; said elastic element sensitive to a stress variation therein caused by a variation in the measurand forming part of both first and second polarization-optical channels and being arranged therein downstream of said first and second polarizers with respect to said luminous flux; a first analyzer of said first polarization-optical channel, arranged therein downstream of said elastic element with respect to said first portion of said luminous flux; a second analyzer of said second polarization-optical channel, arranged therein downstream of said elastic element with respect to said second portion of said luminous flux; a means for varying the intensity of said second portion of said luminous flux in said second polarization-optical channel, said intensity variation being opposite in polarity to that in said first portion of said luminous flux in said first polarization-optical channel, said luminous flux passing through said means; a first photocell of said first polarization-optical channel, arranged therein downstream of said first analyzer with respect to said first portion of said luminous flux and converting the light incident thereupon into an electrical signal; a second photocell of said second polarization-optical channel, arranged therein in a differential relationship with said first photocell downstream of said second analyzer with respect to said second portion of said luminous flux and converting the light incident thereupon into an electrical signal; the difference in said electrical signals at the outputs of said first and second photocells being representative of the measurand.

16. A pressure gauge comprising: a housing; an elastic element accommodated in said housing and sensitive to a stress variation therein caused by a variation in the measurand, i.e. in pressure; a diaphragm also accommodated in said housing, which is coupled with said elastic element and causing a stress variation therein following a variation in said measurand; a piezo-optic measuring transducer accommodated in said housing, which measures said stress variation in said elastic element; at least one light source in said piezo-optic measuring transducer; a first polarization-optical channel of said transducer, having a first optical axis, with a first portion of a luminous flux produced by said light source passing therethrough; a second polarization-optical channel of said transducer, having a second optical axis, with a second portion of the luminous flux produced by said light source passing therethrough; a first polarizer of said first polarization-optical channel, arranged therein so that said first portion of said luminous flux is incident thereupon; a second polarizer of said second polarization-optical channel, arranged therein so that said second portion of said luminous flux is incident thereupon; said elastic element sensitive to a stress variation therein caused by a variation in the measurand forming part of both first and second polarization-optical channels and being arranged therein downstream of said first and second polarizers with respect to said luminous flux; a first analyzer of said first polarization-optical channel, arranged therein downstream of said elastic element with respect to said first portion of said luminous flux; a second analyzer of said second polarization-optical channel, arranged therein downstream of said elastic element with respect to said second portion of said luminous flux; a means for varying the intensity of said second portion of said luminous flux in said second polarization-optical channel, said intensity variation being opposite in polarity to that in said first portion of said luminous flux in said first polarization-optical channel, said luminous flux passing through said means; a first photocell of said first polarization-optical channel, arranged therein downstream of said first analyzer with respect to said first portion of said luminous flux and converting the light incident thereupon into an electrical signal; a second photocell of said second polarization-optical channel, arranged therein in a differential relationship with said first photocell downstream of said second analyzer with respect to said second portion of said luminous flux and converting the light incident thereupon into an electrical signal; the difference in said electrical signals at the outputs of said first and second photocells being representative of the measurand.

17. A dynamometer comprising: a housing; an elastic element accommodated in said housing and sensitive to a stress variation therein caused by a variation in the measurand, i.e. in force; a journal also accommodated in said housing, which is coupled with said elastic element and causing a stress variation therein following a variation in said measurand; a piezo-optic measuring transducer accommodated in said housing, which measures said stress variation in said elastic element; at least one light source in said piezo-optic measuring transducer; a first polarization-optical channel of said transducer, having a first optical axis, with a first portion of a luminous flux produced by said light source passing therethrough; a second polarization-optical channel of said transducer, having a second optical axis, with a second portion of the luminous flux produced by said light source passing therethrough; a first polarizer of said first polarization-optical channel, arranged therein so that said first portion of said luminous flux is incident thereupon; a second polarizer of said second polarization-optical channel, arranged therein so that said second portion of said luminous flux is incident thereupon; said elastic element sensitive to a stress variation therein caused by a variation in the measurand forming part of both first and second polarization-optical channels and being arranged therein downstream of said first and second polarizers with respect to said luminous flux; a first analyzer of said first polarization-optical channel, arranged therein downstream of said elastic element with respect to said first portion of said luminous flux; a second analyzer of said second polarization-optical channel, arranged therein downstream of said elastic element with respect to said second portion of said luminous flux; a means for varying the intensity of said second portion of said luminous flux in said second polarization-optical channel, said intensity variation being opposite in polarity to that in said first portion of said luminous flux in said first polarization-optical channel, said luminous flux passing through said means; a first photocell of said first polarization-optical channel, arranged therein downstream of said first analyzer with respect to said first portion of said luminous flux and converting the light incident thereupon into an electrical signal; a second photocell of said second polarization-optical channel, arranged therein in a differential relationship with said first photocell downstream of said second analyzer with respect to said second portion of said luminous flux and converting the light incident thereupon into an electrical signal; the difference in said electrical signals at the outputs of said first and second photocells being representative of the measurand.

18. A thermometer comprising: a housing; an elastic element accommodated in said housing and sensitive to a stress variation therein caused by a variation in the measurand, i.e. in temperature; said housing having a thermal expansion coefficient different from that of said elastic element and being coupled therewith and causing a stress variation therein following a variation in said measurand; a piezo-optic measuring transducer accommodated in said housing, which measures said stress variation in said elastic element; at least one light source in said piezo-optic measuring transducer; a first polarization-optical channel of said transducer, having a first optical axis, with a first portion of a luminous flux produced by said light source passing therethrough; a second polarization-optical channel of said transducer, having a second optical axis, with a second portion of the luminous flux produced by said light source passing therethrough; a first polarizer of said first polarization-optical channel, arranged therein so that said first portion of said luminous flux is incident thereupon; a second polarizer of said second polarization-optical channel, arranged therein so that said second portion of said luminous flux is incident thereupon; said elastic element sensitive to a stress variation therein caused by a variation in the measurand forming part of both first and second polarization-optical channels and being arranged therein downstream of said first and second polarizers with respect to said luminous flux; a first analyzer of said first polarization-optical channel, arranged therein downstream of said elastic element with respect to said first portion of said luminous flux; a second analyzer of said second polarization-optical channel, arranged therein downstream of said elastic element with respect to said second portion of said luminous flux; a means for varying the intensity of said second portion of said luminous flux in said second polarization-optical channel, said intensity variation being opposite in polarity to that in said first portion of said luminous flux in said first polarization-optical channel, said luminous flux passing through said means; a first photocell of said first polarization-optical channel, arranged therein downstream of said first analyzer with respect to said first portion of said luminous flux and converting the light incident thereupon into an electrical signal; a second photocell of said second polarization-optical channel, arranged therein in a differential relationship with said first photocell downstream of said second analyzer with respect to said second portion of said luminous flux and converting the light incident thereupon into an electrical signal; the difference in said electrical signals at the outputs of said first and second photocells being representative of the measurand.

* * * * *